United States Patent
Yokomakura et al.

(10) Patent No.: US 10,912,046 B2
(45) Date of Patent: Feb. 2, 2021

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/337,326

(22) PCT Filed: Aug. 31, 2017

(86) PCT No.: PCT/JP2017/031357
§ 371 (c)(1),
(2) Date: Mar. 27, 2019

(87) PCT Pub. No.: WO2018/061599
PCT Pub. Date: Apr. 5, 2018

(65) Prior Publication Data
US 2020/0037273 A1    Jan. 30, 2020

(30) Foreign Application Priority Data
Sep. 29, 2016 (JP) .................. 2016-191052

(51) Int. Cl.
*H04W 56/00* (2009.01)
*H04L 5/00* (2006.01)
(Continued)

(52) U.S. Cl.
CPC .......... *H04W 56/001* (2013.01); *H04L 5/001* (2013.01); *H04W 72/044* (2013.01); *H04W 72/12* (2013.01)

(58) Field of Classification Search
CPC .......... H04W 56/001; H04W 56/0015; H04W 56/002; H04W 72/044; H04W 72/0446; H04W 72/12; H04L 5/0007; H04L 5/001
See application file for complete search history.

(56) References Cited

U.S. PATENT DOCUMENTS 9,407,409 B2 *  8/2016  Bhattad ................. H04L 5/001
10,517,061 B1 * 12/2019  Kumar .................. H04W 24/08
(Continued)

FOREIGN PATENT DOCUMENTS

EP    3487240 A1    5/2019
WO    2015/080646 A1    6/2015

OTHER PUBLICATIONS

NTT Docomo, "Revision of SI: Study on New Radio Access Technology", RP-161214, 3GPP TSG RAN Meeting #72, Busan, Korea, Jun. 13-16, 2016.
(Continued)

*Primary Examiner* — Kevin D Mew
(74) *Attorney, Agent, or Firm* — ScienBiziP, P.C.

(57) ABSTRACT

To provide a terminal apparatus including a receiver configured to receive, in a time resource including a plurality of OFDM symbol groups, a synchronization signal included in each of the plurality of OFDM symbol groups, a synchronization unit configured to determine a position of a first synchronization signal that is one of the synchronization signals, and a detection unit configured to receive, based on the first synchronization signal, a physical broadcast channel. The time resource is periodically allocated, and a maximum number of the plurality of OFDM symbol groups
(Continued)

in which the synchronization signal included in the time resource is possibly transmitted is predefined.

4 Claims, 15 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2008/0225965 A1* | 9/2008 | Pi | H04L 1/0003 375/260 |
| 2009/0279421 A1* | 11/2009 | Wang | H04L 27/2662 370/210 |
| 2011/0222513 A1* | 9/2011 | Zhou | G01S 5/10 370/336 |
| 2012/0039287 A1* | 2/2012 | Ko | H04L 5/0053 370/329 |
| 2014/0293858 A1* | 10/2014 | Kalhan | H04W 4/06 370/311 |
| 2015/0078465 A1* | 3/2015 | Yi | H04L 5/001 375/260 |
| 2015/0131560 A1* | 5/2015 | Von Elbwart | H04W 72/042 370/329 |
| 2015/0223194 A1* | 8/2015 | Li | H04W 24/08 455/456.1 |
| 2016/0192398 A1* | 6/2016 | Wang | H04J 11/00 370/329 |
| 2018/0007688 A1* | 1/2018 | Fu | H04W 72/14 |
| 2018/0248735 A1* | 8/2018 | Zhang | H04W 56/0005 |
| 2019/0319699 A1* | 10/2019 | Lee | H04B 7/2656 |

OTHER PUBLICATIONS

Samsung et al., "WF on Supported NR Operations", R1-165559, 3GPP TSG RAN WG1 #85, Nanjing, China, May 23-27, 2016.
Mediatek Inc, "Beam Sweeping Design Issues in NR", R1-167525, 3GPP TSG RAN WG1 Meeting #85 Gothenburg, Sweden Aug. 22-26, 2016.
Steven Ferrante et al., "mm Wave Initial Cell Search Analysis under UE Rotational Motion", IEEE, Oct. 4, 2015, pp. 1-7, XP032809379.

* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

The present application claims priority based on Japanese Patent Application No. 2016-191052 filed on Sep. 29, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal. Terrestrial Radio Access (EUTRA)") have been studied in the 3rd Generation Partnership Project (3GPP). Furthermore, the 3GPP is currently conducting a technical study and standardization of a technology of LTE-Advanced Pro which is an extended technology of the LTE and New Radio (NR) technology which is a new radio access technology as a radio access method and a radio network technology for the 5th generation cellular system. (NPL 1).

In the 5th generation cellular system, three technologies are required for the expected service scenario, that is, enhanced Mobile BroadBand (eMBB) to realize a high-speed and high-capacity transmission, Ultra-Reliable and Low Latency Communication (URLLC) to realize a low delay and highly reliable communication, and massive Machine Type Communication (mMTC), such as Internet of Things (IoT), that allows a large number of machine type devices to be connected.

In LTE, in a case that a terminal apparatus starts communication with a network via a base station apparatus, a synchronization needs to be established, and a Synchronization Signal (SS) for the synchronization is prepared. In LTE, the terminal apparatus detects a synchronization signal transmitted at a specific period from the base station apparatus, and based on a reception timing of the detected synchronization signal and information on a code sequence of the received synchronization signal, acquires a timing synchronization, a frequency synchronization, and a Cell ID (Physical Cell ID: PCI). The terminal apparatus acquires broadcast information including information necessary for starting communication, based on the acquired information.

In NR, in order to widen a coverage mainly in a cell using a high frequency with high attenuation, it is considered to configure multiple regions within a cell by beamforming and sequentially transmit a signal for each region to cover the entire cell (NPL 2). The beamforming may be referred to as precoding or virtualization.

Like LTE, a synchronization signal for taking synchronization between the terminal apparatus and the base station apparatus has also been studied for NR.

CITATION LIST

Non Patent Literature

NPL 1: RP-161214, NTT DOCOMO, "Revision of SI: Study on New Radio Access Technology", June 2016

NPL 2: 3GPP R1-165559 http://www.3gpp.org/ftp/ts-g_ran/WG1_RL1/TSGR1_85/Docs/R1-165559 zip

SUMMARY OF INVENTION

Technical Problem

An object of an aspect of the present invention is to provide a terminal apparatus capable of efficiently starting communication with a base station apparatus, a base station apparatus for communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following means. That is, a first aspect of the present invention is a terminal apparatus including a receiver configured to receive, in a time resource including a plurality of OFDM symbol groups, a synchronization signal included in each of the plurality of OFDM symbol groups, a synchronization unit configured to determine a position of a first synchronization signal that is one of the synchronization signals, and a detection unit configured to receive, based on the first synchronization signal, a physical broadcast channel. The time resource is periodically allocated, and a maximum number of OFDM symbol groups in which the synchronization signal included in the time resource is possibly transmitted is predefined.

(2) In the first aspect of the present invention, the synchronization signal is mapped in some of the plurality of OFDM symbol groups.

(3) In the first aspect of the present invention, an OFDM symbol in the time resource and the physical broadcast channel are received at a reference subcarrier spacing.

(4) A second aspect of the present invention is a base station apparatus including a transmitter configured to transmit, in a time resource including a plurality of OFDM symbol groups, a synchronization signal included in each of the plurality of OFDM symbol groups, and a broadcast information transmitter configured to transmit a physical broadcast channel corresponding to the synchronization signal included in each of the plurality of OFDM symbols. The time resource is periodically allocated, and a maximum number of the plurality of OFDM symbol groups in which the synchronization signal included in the time resource is possibly transmitted is predefined.

(5) In the second aspect of the present invention, the synchronization signal is mapped in some of the plurality of OFDM symbol groups.

(6) In the second aspect of the present invention, an OFDM symbol in the time resource and the physical broadcast channel are transmitted at a reference subcarrier spacing.

(7) A third aspect of the present invention is a communication method of a terminal apparatus, including the steps of: receiving, in a time resource including a plurality of OFDM symbol groups, a synchronization signal included in each of the plurality of OFDM symbol groups, determining a position of a first synchronization signal that is one of the synchronization signals, and receiving, based on the first synchronization signal, a physical broadcast channel. The time resource is periodically allocated, and a maximum number of the plurality of OFDM symbol groups in which the synchronization signal included in the time resource is possibly transmitted is predefined.

(8) A fourth aspect of the present invention is a communication method of a base station apparatus, including the steps of: transmitting, in a time resource including a plurality of OFDM symbol groups, a synchronization signal included in each of the plurality of OFDM symbol groups, and transmitting a physical broadcast channel corresponding to the synchronization signal included in each of the plurality of OFDM symbols. The time resource is periodically allocated, and a maximum number of the plurality of OFDM symbol groups in which the synchronization signal included in the time resource is possibly transmitted is predefined.

(9) A fifth aspect of the present invention is an integrated circuit mounted on a terminal apparatus, including a receiver configured to receive, in a time resource including a plurality of OFDM symbol groups, a synchronization signal included in each of the plurality of OFDM symbol groups, a synchronizer configured to determine a position of a first synchronization signal that is one of the synchronization signals, and a detector configured to receive, based on the first synchronization signal, a physical broadcast channel. The time resource is periodically allocated, and a maximum number of the plurality of OFDM symbol groups in which the synchronization signal included in the time resource is possibly transmitted is predefined.

(10) A sixth aspect of the present invention is an integrated circuit mounted on a base station apparatus, including a transmitter configured to transmit, in a time resource including a plurality of OFDM symbol groups, a synchronization signal included in each of the plurality of OFDM symbol groups, and a broadcast information transmitter configured to transmit a physical broadcast channel corresponding to the synchronization signal included in each of the plurality of OFDM symbols. The time resource is periodically allocated, and a maximum number of the plurality of OFDM symbol groups in which the synchronization signal included in the time resource is possibly transmitted is predefined.

Advantageous Effects of Invention

According to one aspect of the present invention, a terminal apparatus and a base station apparatus can efficiently start communication.

DESCRIPTION OF EMBODIMENTS

Embodiments of the present invention will be described below.

A radio communication system and a radio network according to the present embodiment will be described.

Figure 1:
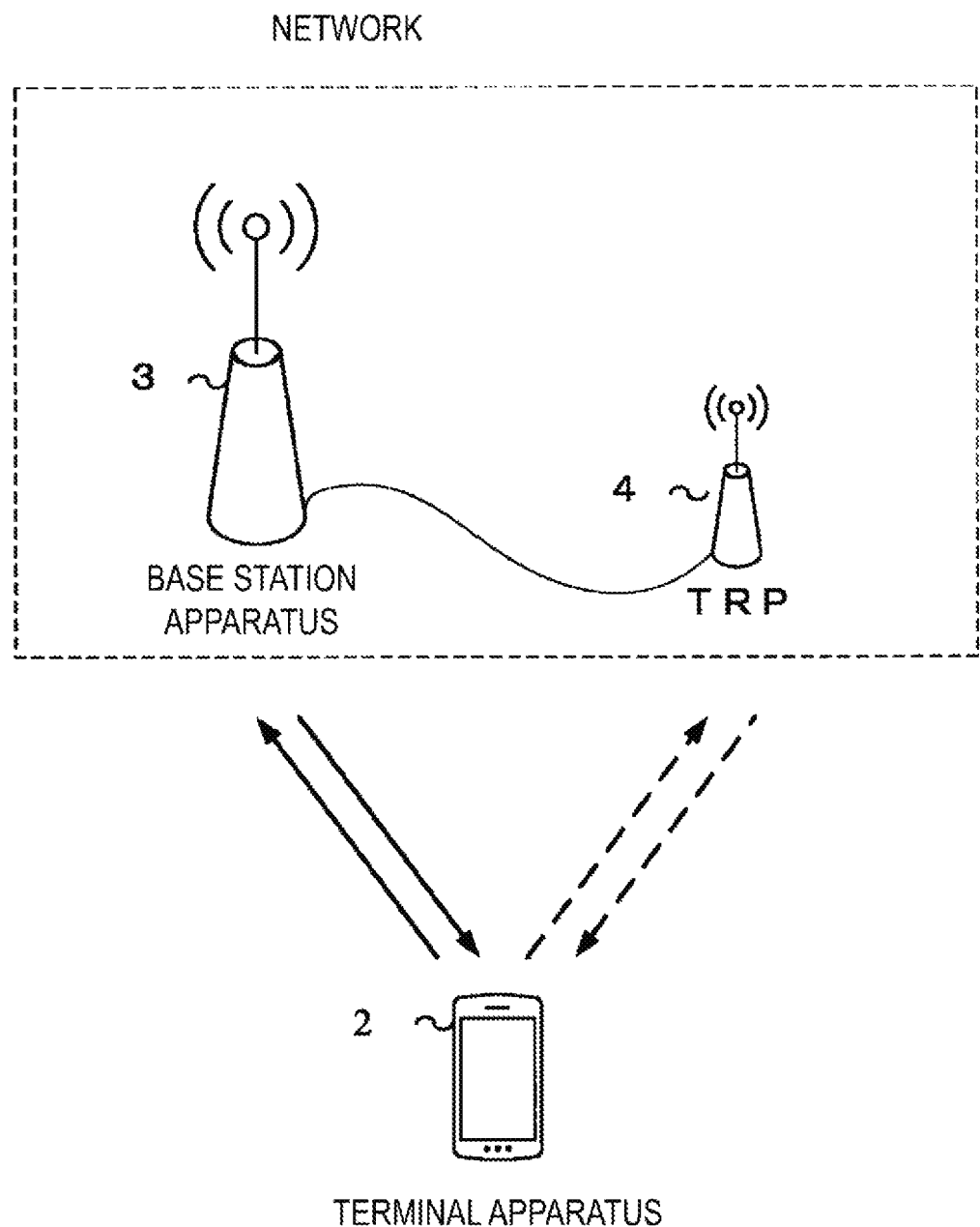
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3. Furthermore, the base station apparatus 3 may include one or more transmission reception points (TRPs) 4. The base station apparatus 3 may have a communicable range (communication area), controlled by the base station apparatus 3, that includes one or more cells to serve the terminal apparatus 2. Furthermore, the base station apparatus 3 may have a communicable range (communication area), controlled by one or more transmission reception points 4, that includes one or more cells to serve the terminal apparatus 2. Furthermore, one cell may be divided into multiple beamed areas, and the terminal apparatus 2 may be served in each of the beamed areas. Here, a beamed area may be identified based on a precoding index.

The communication area covered by the base station apparatus 3 may be different in size and shape for each frequency. Moreover, the covered area may be different for each frequency. Furthermore, a radio network, in which cells having different types of base station apparatuses 3 and different cell radii coexist on the same frequency or different frequencies to form one communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A radio communication link from the terminal apparatus 2 to another terminal apparatus 2 is referred to as a side link.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 2 and the base station apparatus 3 and/or the radio communication between the terminal apparatus 2 and another terminal apparatus 2.

In FIG. 1, in the radio communication between the terminal apparatus 2 and the base station apparatus 3 and/or the radio communication between the terminal apparatus 2 and the other terminal apparatus 2, Universal-Filtered Multi-Carrier (UFMC), Filtered OFDM (F-OFDM), OFDM in which a window is multiplied (Windowed OFDM), and Filter-Bank Multi-Carrier (FBMC) may be used.

In FIG. 1, the aforementioned transmission scheme that uses no CP or uses zero padding instead of the CP may be employed for the radio communication between the terminal apparatus 2 and the base station apparatus 3 and/or the radio communication between the terminal apparatus 2 and the other terminal apparatus 2. Further, the CP and the zero padding may be added both forward and backward.

The terminal apparatus 2 operates while considering the inside of a cell as a communication area. The terminal apparatus 2 may move to an appropriate different cell through a cell reselection procedure in a case that no radio connection exists (also referred to as an idle state or an RRC_IDLE state) and through a handover procedure in a case that a radio connection exists (also called a connected state, or an RRC_CONNECTED state). Generally, the appropriate cell means that it is determined, based on information indicated from the base station apparatus 3, that access by the terminal apparatus 2 is not prohibited in the cell, and that the reception quality of a downlink satisfies a prescribed condition in the cell.

In a case that the terminal apparatus 2 can communicate with a certain base station apparatus 3, a cell configured to be used for communication with the terminal apparatus 2 may be referred to as "Serving cell" and the other cells not used for the communication may be referred to as "Neighboring cell", among the cells of the base station apparatus 3. Furthermore, the neighboring cell that broadcasts or notifies, to the terminal apparatus 2, some or all of the pieces of system information required in the serving cell is also referred to as an assisting cell.

According to the present embodiment, one or more serving cells are configured for the terminal apparatus 2. The multiple serving cells configured include one primary cell and one or more secondary cells. The primary cell is a serving cell in which an initial connection establishment procedure has been performed, a serving cell in which a connection re-establishment procedure has been started, or a cell indicated as a primary cell during a handover procedure. One or more secondary cells may be configured at a point of time at which a Radio Resource Control (RRC) connection is established or after the RRC connection is established.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated.

Physical channels and physical signals according to the present embodiment will be described.

In FIG. 1, the following physical channels are used for radio communication between the terminal apparatus 2 and the base station apparatus 3. The physical channels are used for transmitting information output from a higher layer.

Physical Broadcast CHannel (PBCH)
Physical Control CHannel (PCCH)
Physical Shared CHannel (PSCH)
Physical Random Access CHannel (PRACH)

The PBCH is used for the base station apparatus 3 to broadcast an important information block (Master information Block: MIB, Essential Information Block: EIB) including important system information (Essential information) required by the terminal apparatus 2. Here, one or more important information blocks may be transmitted as important information messages. For example, information on a location within a super frame including multiple radio frames (information indicating some or all of frame numbers (System Frame Numbers: SFNs) within the super frame, for example) may be included in the important information block. In addition, in a case that a different important information block is transmitted for each region within a cell, information for identifying the region (for example, the identifier information of a transmission beam for configuring the region) may be included. Here, the identifier information of the transmission beam may be indicated by using a precoding index. Furthermore, in a case that a different important information block (important information message) is transmitted for each region within the cell, information for identifying a time location within the frame (for example, a subframe number in which the important information block (important information message) is included) may be included. That is, information for determining each of the subframe numbers in which the respective important information blocks (important information messages) using different precoding indexes are transmitted may be included. For example, information necessary for connection to the cell and for mobility may be included in the important information.

In a case of uplink radio communication (radio communication from the terminal apparatus 2 to the base station apparatus 3), the PCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK may indicate HARQ-ACK for downlink data (Transport block, Medium Access Control Protocol Data Unit (MAC PDU), Downlink-Shared Channel (DL-SCH)).

Furthermore, in a case of downlink radio communication (radio communication from the base station apparatus 3 to the terminal apparatus 2), the PCCH is used to transmit Downlink Control Information (DCI). Here, one or more DCIs (which may be referred to as DCI formats) are defined for transmission of the Downlink Control Information. That is, a field for the Downlink Control Information is defined as the DCI, and is mapped to information bits.

For example, DCI including information for indicating whether a signal included in the scheduled PSCH is a downlink radio communication or uplink radio communication may be defined.

For example, DCI including information for indicating a downlink transmission period included in the scheduled PSCH may be defined.

For example, DCI including information for indicating an uplink transmission period included in the scheduled PSCH may be defined.

For example, DCI including information for indicating a timing for transmitting HARQ-ACK for the scheduled PSCH (for example, the number of symbols from the last symbol included in the PSCH to the HARQ-ACK transmission) may be defined.

For example, DCI including information for indicating a downlink transmission period, a gap, and an uplink transmission period that are included in the scheduled PSCH may be defined.

For example, DCI to be used for scheduling a PSCH for downlink radio communication in one cell (transmission of one downlink transport block) may be defined.

For example, DCI to be used for scheduling a PSCH for uplink radio communication in one cell (transmission of one uplink transport block) may be defined.

Here, information on scheduling of the PSCH is included in the DCI in a case that an uplink or a downlink is included in the PSCH. Here, the DCI for the downlink is also referred to as downlink grant or downlink assignment. Here, the DCI for the uplink is also referred to as uplink grant or Uplink assignment.

The PSCH is used to transmit uplink data (Uplink Shared CHannel: UL-SCH) or downlink data (Downlink Shared Channel: DL-SCH) from Medium Access Control (MAC). In a case of the downlink, the PSCH is also used to transmit System Information (SI) and Random Access Response (RAR). In a case of the uplink, the PSCH may be used to transmit HARQ-ACK and/or CSI, together with the uplink data. Furthermore, the PSCH may be used to transmit CSI only or HARQ-ACK and CSI only. That is, the PSCH may be used to transmit UCI only.

Here, the base station apparatus 3 and the terminal apparatus 2 exchange (transmit and/or receive) signals with each other in a higher layer. For example, the base station apparatus 3 and the terminal apparatus 2 may transmit and receive radio resource control (RRC) signaling (also referred to as RRC message or RRC information) in the RRC layer. The base station apparatus 3 and the terminal apparatus 2 may transmit and receive a Medium Access Control (MAC) control element in a MAC layer. Here, the RRC signaling and/or the MAC control element is also referred to as higher layer signaling.

The PSCH may be used to transmit the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, terminal apparatus 2 specific (UE specific) information may be transmitted through signaling dedicated to the certain terminal apparatus 2. The PSCH may be used to transmit UE Capability in the uplink.

Although the names PCCH and PSCH are consistently used for both the downlink and uplink, different channels may be defined for the downlink and uplink. For example, the PCCH for the downlink may be defined as Physical Downlink Control CHannel (PDCCH), and the PCCH for the uplink may be defined as Physical Uplink Control CHannel (PUCCH). For example, the PSCH for the downlink may be defined as Physical Downlink Shared CHannel (PDSCH), and the PSCH for the uplink may be defined as Physical Uplink Shared Channel (PUSCH).

The PRACH may be used to transmit a random access preamble (random access message 1).

The PRACH may be used to indicate an initial connection establishment procedure, a handover procedure, a connection re-establishment procedure, synchronization for uplink transmission (timing adjustment), and a request for a PUSCH (UL-SCH) resource.

A CRC parity bit attached to a downlink grant or an uplink grant may be XORed with identifier information such as a Cell-Radio Network Temporary Identifier (C-RNTI), a Temporary C-RNTI, and Semi Persistent Scheduling (SPS) Cell-Radio Network Temporary identifier (RNTI). The C-RNTI and the SPS C-RNTI may be used as identifiers for identifying the terminal apparatus 2 within a cell. The Temporary C-RNTI is used during a contention based random access procedure.

The C-RNTI may be used to control the PDSCH or the PDSCH in one subframe. The SPS C-RNTI may be used to periodically allocate a resource of the PDSCH or the PUSCH. The Temporary C-RNTI may be used during a random access, In FIG. 1, the following downlink physical signals may be used for the downlink radio communication.

Synchronization Signal (SS)

Reference Signal (RS)

The synchronization signal may be used for the terminal apparatus 2 to take synchronization in the frequency domain and the time domain in the downlink. The synchronization signal may include a Primary Synchronization Signal (PSS) and/or a Second Synchronization Signal (SSS). Furthermore, the synchronization signal may be used for the terminal apparatus 2 to perform a selection regarding the preceding by the base station apparatus 3 or a selection regarding the preceding or beam in the beamforming. That is, the synchronization signal may be used for the terminal apparatus 2 to determine a preceding index or a beam index applied by the base station apparatus 3 to the downlink signal.

A downlink reference signal (hereinafter, simply referred to as reference signal) is used mainly for the terminal apparatus 2 to perform channel compensation on a downlink physical channel. That is, a demodulation reference signal may be included in the downlink reference signal. The downlink reference signal may be used for the terminal apparatus 2 to calculate downlink channel state information. That is, channel state information reference signal may be included in the downlink reference signal. In addition, the downlink reference signal may be used for fine synchronization of which the level is enough to perform determination of numerology for a radio parameter or a subcarrier spacing, an FFT window synchronization, or the like.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack handling user data of the terminal apparatus 2 and the base station apparatus 3 is referred to as User-plane (U-plane (UP)) protocol stack, and a protocol stack handling control data is referred to as Control-plane (C-plane (CP)) protocol stack.

The physical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PRY layer. The data is transmitted and received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are roughly classified depending on the type of transmitted information, specifically, classified into the control channels transmitting the control information and the traffic channels transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs segmentation or concatenation of the data received from the higher layer to adjust its data size so that a lower layer can appropriately transmit the data. The RLC layer also has a function to ensure Quality of Service (QoS) required for each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-Plane protocol stack. The RRC layer performs configuration and reconfiguration of Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message or control information. The DRB may be used as a path for transmitting the user data. The RBs may be configured between the RRC layers of the base station apparatus 3 and the terminal apparatus 2.

Note that the PHY layer corresponds to a physical layer, which is a first layer in a layered structure of a generally known Open Systems Interconnection (OSI) model, the MAC layer, the RLC layer, and the PDCP layer correspond to a data link layer, which is a second layer in the OSI model, and the RRC layer corresponds to a network layer, which is a third layer in the OSI model.

The functional classification of the MAC layer, the RLC layer, and the PDCP layer described above is an example, and some or all of the functions may not be implemented. Some or all of the functions of each layer may be included in another layer.

A signaling protocol used between the network and the terminal apparatus 2 is classified into an Access Stratum (AS) protocol and a Non-Access Stratum (NAS) protocol. For example, a protocol in the RRC layer or in a lower layer is the Access Stratum protocol used between the terminal apparatus 2 and the base station apparatus 3, Further, a protocol such as Connection Management (CM) and Mobility Management (MM) of the terminal apparatus 2 is the Non-Access Stratum protocol, and is used between the terminal apparatus 2 and a core network (CN). For example, between the terminal apparatus 2 and a Mobility Management Entity (MME), communication using the Non-Access Stratum protocol is transparently performed via the base station apparatus 3.

An example of a radio frame structure according to the present embodiment will be described.

Figure 4:
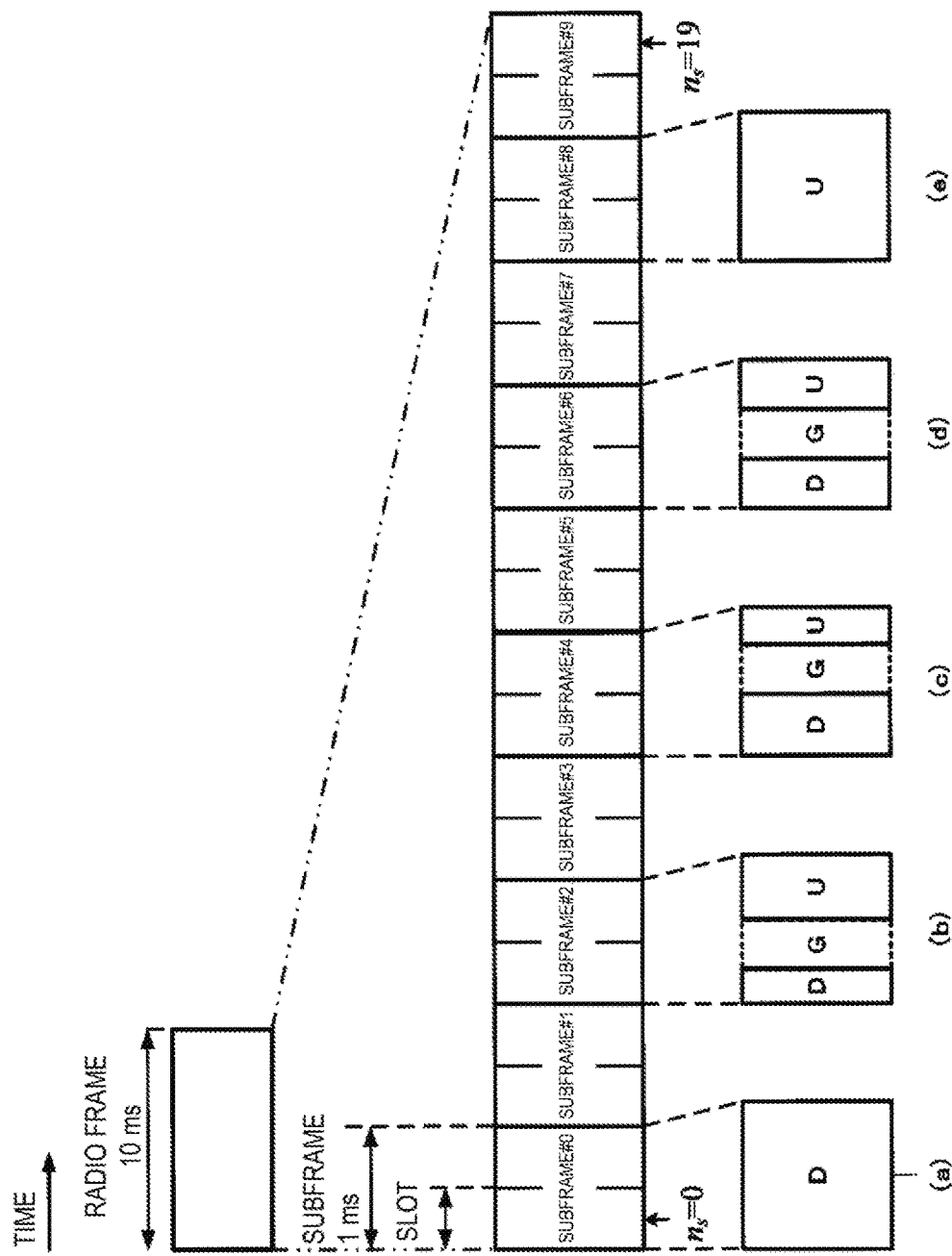
FIG. 4 is a diagram illustrating an example of a radio frame structure according to the embodiment of the present invention.

FIG. 4 is a diagram illustrating an example of a radio frame structure according to the present embodiment. In FIG. 4, the horizontal axis is a time axis. One radio frame may include multiple (for example, 20) slots contiguous in the time domain. FIG. 4 illustrate an example in which one radio frame includes 20 slots from Ns=0 to Ns=19. Further, the multiple contiguous slots (for example, two slots) may constitute one subframe. FIG. 4 illustrates an example in which two slots constitute one subframe. Here, the subframe may simply be expressed as a certain time domain (time period).

Further, as illustrated in FIG. 4, the subframe may include a part (downlink part) "D" to be used for downlink transmission, a part (uplink part) "U" to be used for uplink transmission, and a part (GAP) "G" for switching between the uplink and the downlink. As illustrated in FIG. 4, one subframe may include one or more of the following parts, or a combination thereof.

the downlink part
the gap
the uplink part

In FIG. 4, although a case in which a time period includes one subframe is described as an example, the present embodiment is not limited thereto, and multiple time periods may be included within one subframe or the time period may include multiple subframes (or slots).

Subframe (a) of FIG. 4 is an example where an entire subframe is used for downlink transmission. Subframe (b) of FIG. 4 is an example where uplink scheduling is performed, for example, via the PCCH in the first time resource, a gap is provided in the second time resource, the gap being required for a processing delay of the PCCH, a switching time from the downlink to the uplink, and generation of a transmit signal, and an uplink signal is transmitted in the third time resource. Subframe (c) of FIG. 4 is an example where the downlink PCCH and/or the downlink PSCH is transmitted in the first time resource, a gap is provided in the second time resource, the gap being required for a processing delay, a switching time from the downlink to the uplink, and generation of a transmit signal, and the PSCH or PCCH is transmitted in the third time resource. Here, the uplink signal may be used to transmit HARQ-ACK and/or CSI, that is, UCI. In subframe (d) of FIG. 4, the downlink PCCH and/or the downlink PSCH is transmitted in the first time resource, a gap is provided in the second time resource, the gap being required for a processing delay, a switching time from the downlink to the uplink, and generation of a transmit signal, and the uplink PCCH and/or the uplink PSCH is transmitted in the third time resource. Here, the uplink signal may be used for transmission of uplink data, that is, UL- SCH. Subframe (e) of FIG. 4 is an example where a whole of a certain subframe is used for uplink transmission (uplink PSCH or PCCH).

The aforementioned downlink part and uplink part may include one or more OFDM symbols or SC-FDMA symbols.

Figure 5:
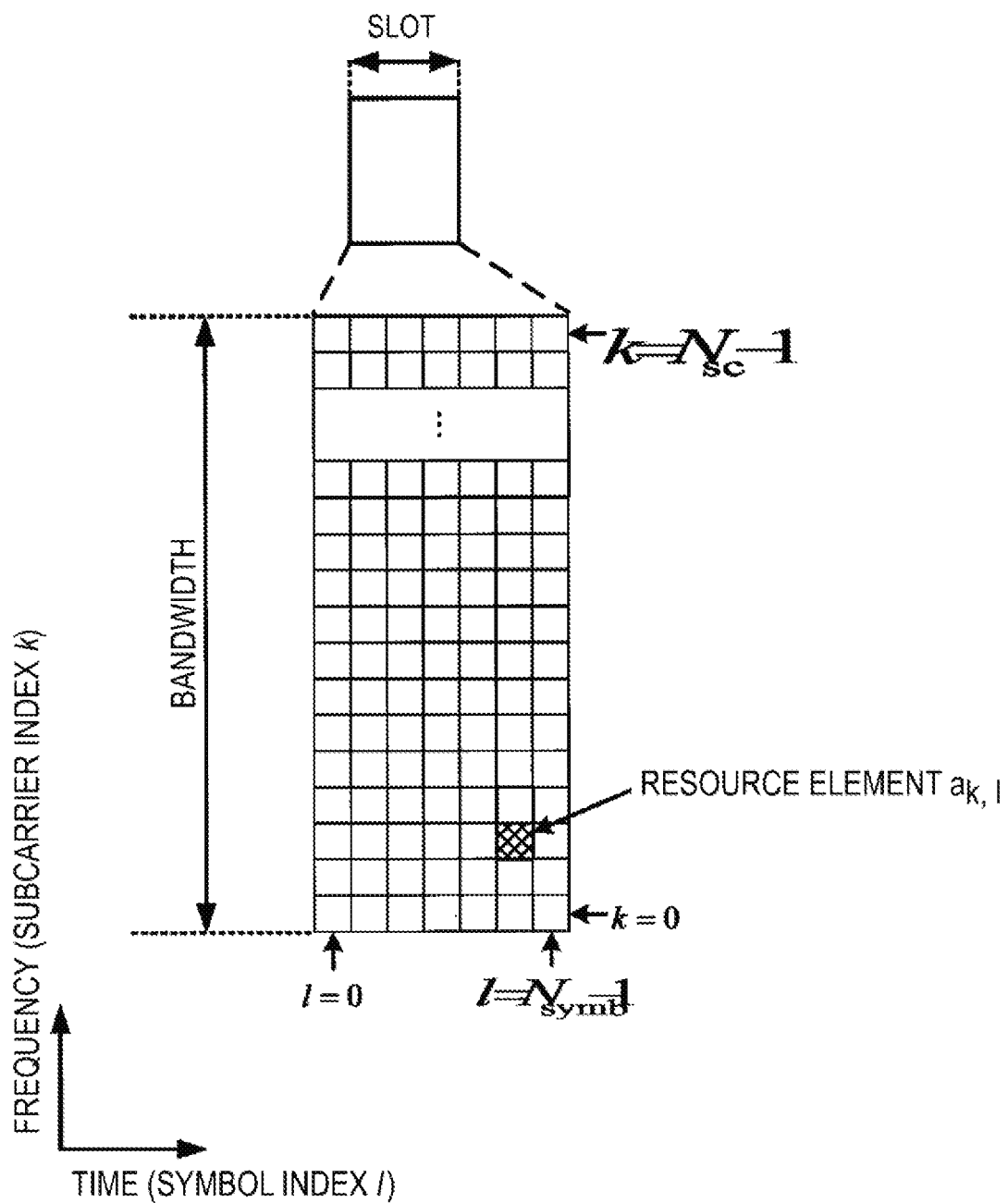
FIG. 5 is a diagram illustrating a detailed example of a radio frame structure according to the embodiment of the present invention.

Further, a resource grid as illustrated in FIG. 5 may be defined by multiple subcarriers and multiple OFDM symbols or SC-FDMA symbols.

In FIG. 5, l is a symbol number/index, and k is a subcarrier number/index. Here, the symbol may be an Orthogonal Frequency Division Multiplexing (OFDM) symbol or a Single Carrier Frequency Division Multiple Access (SC-FDMA) symbol. $N_{SC}$ is a total number of subcarriers included in a bandwidth of the resource grid. The number of subcarriers in the resource grid may depend on a cell bandwidth. $N_{symb}$ is a total number of symbols included in the resource grid. $N_{symb}$ may be given based on a subcarrier spacing.

Here, each element within the resource grid is referred to as resource element. The resource element $a_{k,l}$ may be expressed by a subcarrier number/index k and a symbol number/index l. A resource for transmitting a physical signal or a physical channel may be expressed by the resource element. Further, the resource grid and/or the resource element may be defined for each antenna port.

Figure 6:
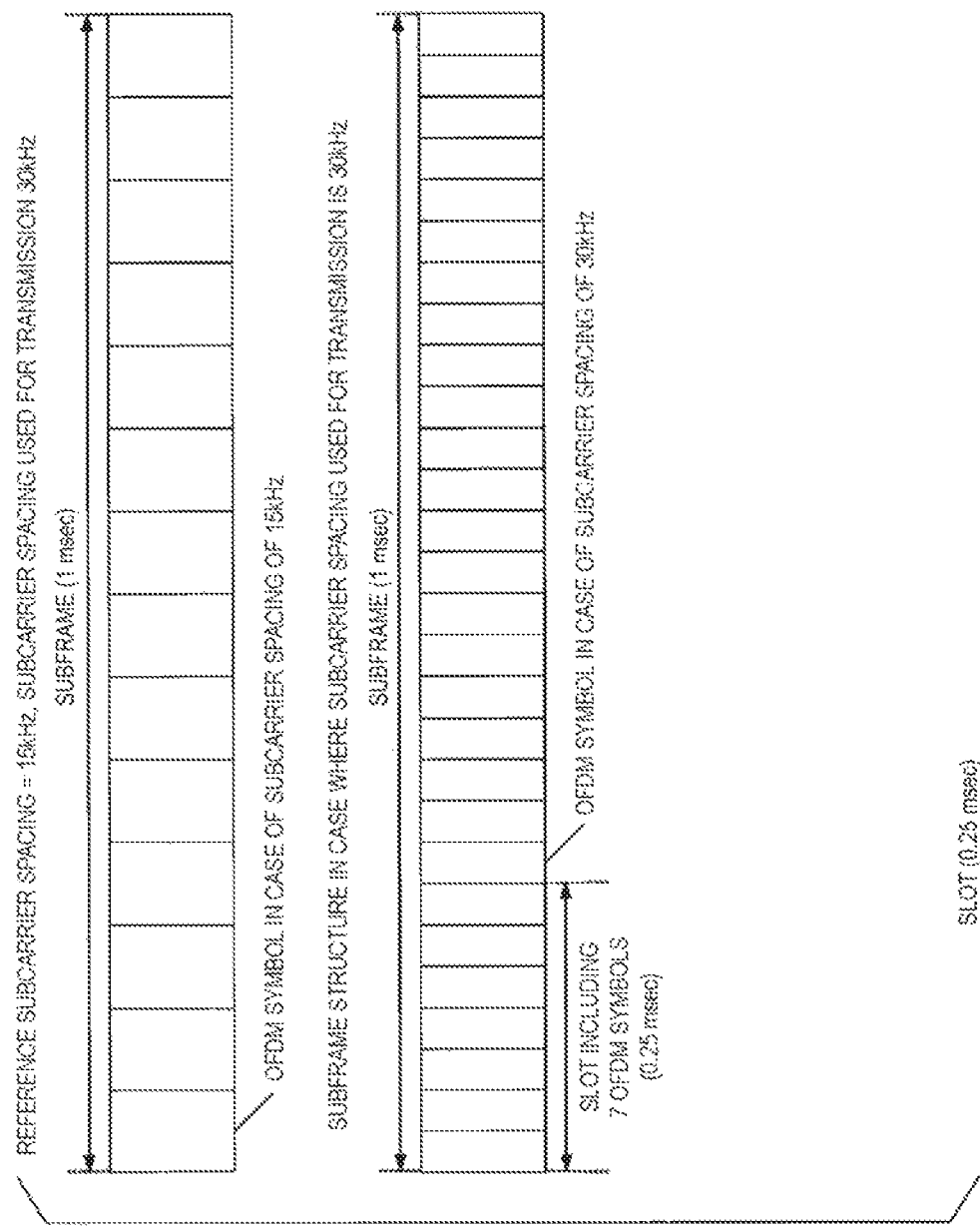
FIG. 6 is a diagram illustrating an example of a configuration of a subframe according to the embodiment of the present invention.

Next, a subframe length will be described. FIG. 6 illustrates an example of a subframe structure. In the present embodiment, a reference subcarrier spacing (a default subcarrier spacing, a predefined subcarrier spacing) and a subcarrier spacing used for transmission may be defined for a numerology of a subframe length. FIG. 6 illustrates a subframe structure and a slot configuration in a case that the reference subcarrier spacing is 15 kHz and the subcarrier spacing used for transmission is 30 kHz.

As for the subframe length, a time length including 14 OFDM symbols with the reference subcarrier spacings may be defined as the subframe length. The subcarrier may be referred to as numerology.

At this time, the reference subcarrier spacing may be 15 kHz and a unit in which 14 OFDM symbols constitute the time length of 1 millisecond may be defined as a subframe. In such a case, the actual subcarrier spacing (used for transmission) may be 30 kHz, while the subframe length may be 1 millisecond and one subframe may include 28 OFDM symbols.

The slot is defined by the same number (y=x) as or half (y=x/2) the number x of OFDM symbols, the OFDM symbols having the reference subcarrier spacings. That is, 7 OFDM symbols or 14 symbols.

As illustrated in FIG. 6, in a case that the reference subcarrier spacing is 15 kHz and the subcarrier spacing 30 kHz of the OFDM symbol used for transmission is 30 kHz, the subframe length is 1 millisecond, and the slot length is 0.25 millisecond in a case of 7 OFDM symbols and 0.5 millisecond in a case of 14 symbols. Thus, depending on the reference subcarrier spacing and the subcarrier spacing used for transmission, the subframe length, the slot length, the number of OFDM symbols included in the subframe, and the number of slots within the subframe are defined.

Although a case in which the reference subcarrier spacing is 15 kHz is described in the example described above, in a case that the reference subcarrier spacing is 30 kHz, a unit including 14 OFDM symbols may be defined as a subframe. That is, as for the subframe length, in a case that the reference subcarrier spacing is M×15 kHz (where M is an integer), the subframe length may be defined as 1/M millisecond, In a certain carrier, the reference subcarrier spacing and the subcarrier spacing used for transmission may be different.

The reference subcarrier spacing may be defined for each frequency range or band, or a common reference subcarrier spacing may be defined in the specification. Further, the reference subcarrier spacing may be determined based on a capability of the terminal apparatus.

A slot may be defined that includes y-OFDM symbols (for example, y=7) of which the number is equal to or fewer than the number of OFDM symbols included in the subframe. Further, the slot may be defined as one of scheduling units.

A mini-slot may be defined that includes z-OFDM symbols (for example, z=2) of which the number is equal to or fewer than the number of OFDM symbols included in the slot. Further, the mini-slot may be defined as one of scheduling units.

Note that the above described embodiment is merely an example, and the slot can be one unit for scheduling and the subframe can be one unit for scheduling. Further, the number of OFDM symbols included in the subframe/slot may be defined based on the reference subcarrier spacing or may be defined based on the subcarrier spacing used for transmission. The slot and/or the subframe may be referred to as Transmission duration. The mini-slot may be referred to as transmission duration.

Here, the antenna port is defined as an antenna port that allows a channel conveyed by a certain symbol in a certain antenna port to be inferred from a channel conveyed by another symbol in the same antenna port. That is, for example, in a case that a first physical channel and a first reference signal are conveyed by symbols in the same antenna port, a channel compensation of the first physical channel may be performed by using the first reference signal. Here, the same antenna port also means that an antenna port number (the number for identifying an antenna port) may be the same.

Figure 7:
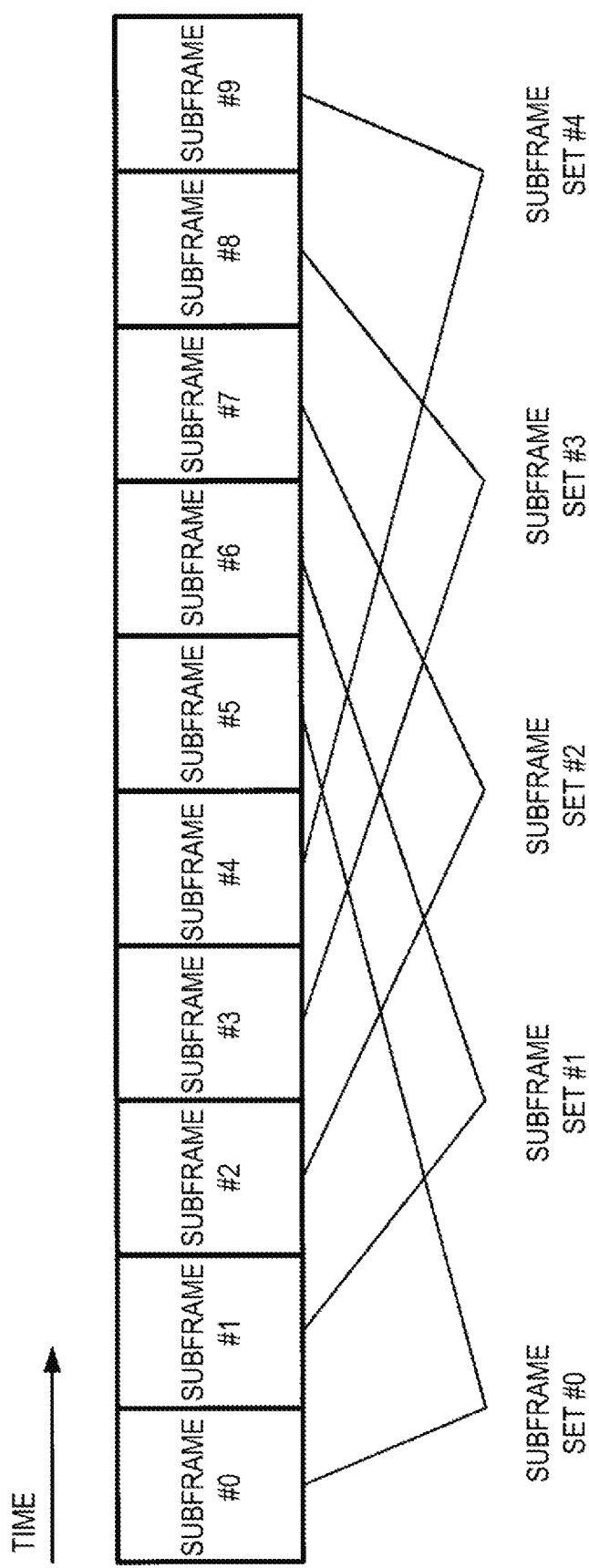
FIG. 7 is a diagram illustrating an example of a subframe set according to the embodiment of the present invention.

The radio frame may include a subframe set including one or more subframes. Further, the radio frame may include multiple subframe sets. For example, in FIG. 7, five subframe sets including two subframes are included in the radio frame. Note that, in the example of FIG. 7, the subframe set includes the equally spaced subframes, but the present embodiment is not limited thereto, and the subframe set may include multiple contiguous subframes or the subframe set may include subframes of which the number is different depending on a type of a service and the number of users. That is, in the radio frame, the subframe set to which one or more subframes belong may be defined (configured). Further, in the radio frame, one or more subframe sets may be defined (configured). Here, one or more subframe sets may be defined by a specification and the like, and may be information known between the base station apparatus 3 and the terminal apparatus 2. In addition, one or more subframe sets may be applied, based on information (signal) transmitted by the base station apparatus 3. Here, the information (signals) may include a synchronization signal and/or a reference signal.

The terminal apparatus 2 may consider that a synchronization signal and a reference signal in the same subframe set are transmitted through one or more antenna ports configured in the subframe set. That is, one or more antenna ports may be defined (configured) that corresponds to one or more subframe sets. Further, the terminal apparatus 2 may consider that the antenna ports of a synchronization signal and a reference signal in the same subframe set are quasi co-located. Further, the terminal apparatus 2 may consider that the antenna ports of a synchronization signal and a reference signal in the same subframe set are quasi co-located. Further, the terminal apparatus 2 may not consider that, even in a case of transmitting a synchronization signal and/or a reference signal in the same subframe set, a synchronization signal and/or a reference signal transmitted in a certain subframe are transmitted from the same antenna port as a synchronization signal and/or a reference signal transmitted in another subframe.

That is, it may be considered that, for transmission of a synchronization signal and transmission of a reference signal in one or more subframes belonging to a certain subframe set, one or more antenna ports corresponding to the certain subframe set are used. Further, it may be considered that an antenna port used for transmitting a synchronization signal and an antenna port used for transmitting a reference signal in one or more subframes belonging to a certain subframe set are quasi co-located. Here, it may be considered that, for transmission of a synchronization signal in one or more subframes belonging to a certain subframe set (one or more transmissions of a synchronization signal), one or more antenna ports (the same antenna port) corresponding to the certain subframe set are used. Further, it may be considered that, for transmission of a reference signal in one or more subframes belonging to a certain subframe set (one or more transmissions of a Reference Signal), one or more antenna ports (the same antenna port) corresponding to the certain subframe set are used.

Here, in a case that large-scale properties of a channel on which a symbol of a certain antenna port is conveyed can be inferred from a channel on which a symbol of another antenna port is conveyed, the two antenna ports are quasi co-located. The large-scale properties include some or all of (1) Delay spread, (2) Doppler spread, (3) Doppler shift, (4) Average gain, and (5) Average delay. For example, the terminal apparatus 2 may consider that, in a certain subframe set, the doppler shift and the average gain, among the large-scale properties of a channel on which symbols of a synchronization signal and a reference signal are conveyed can be inferred from a channel on which a symbol of another antenna port is carried.

Further, the terminal apparatus 2 may consider that a synchronization signal and a reference signal in the same subframe set are transmitted through the same antenna port. That is, it may be considered that, for transmission of a synchronization signal and transmission of a reference signal in one or more subframes belonging to the same subframe set, the same antenna port is used.

Figure 8:
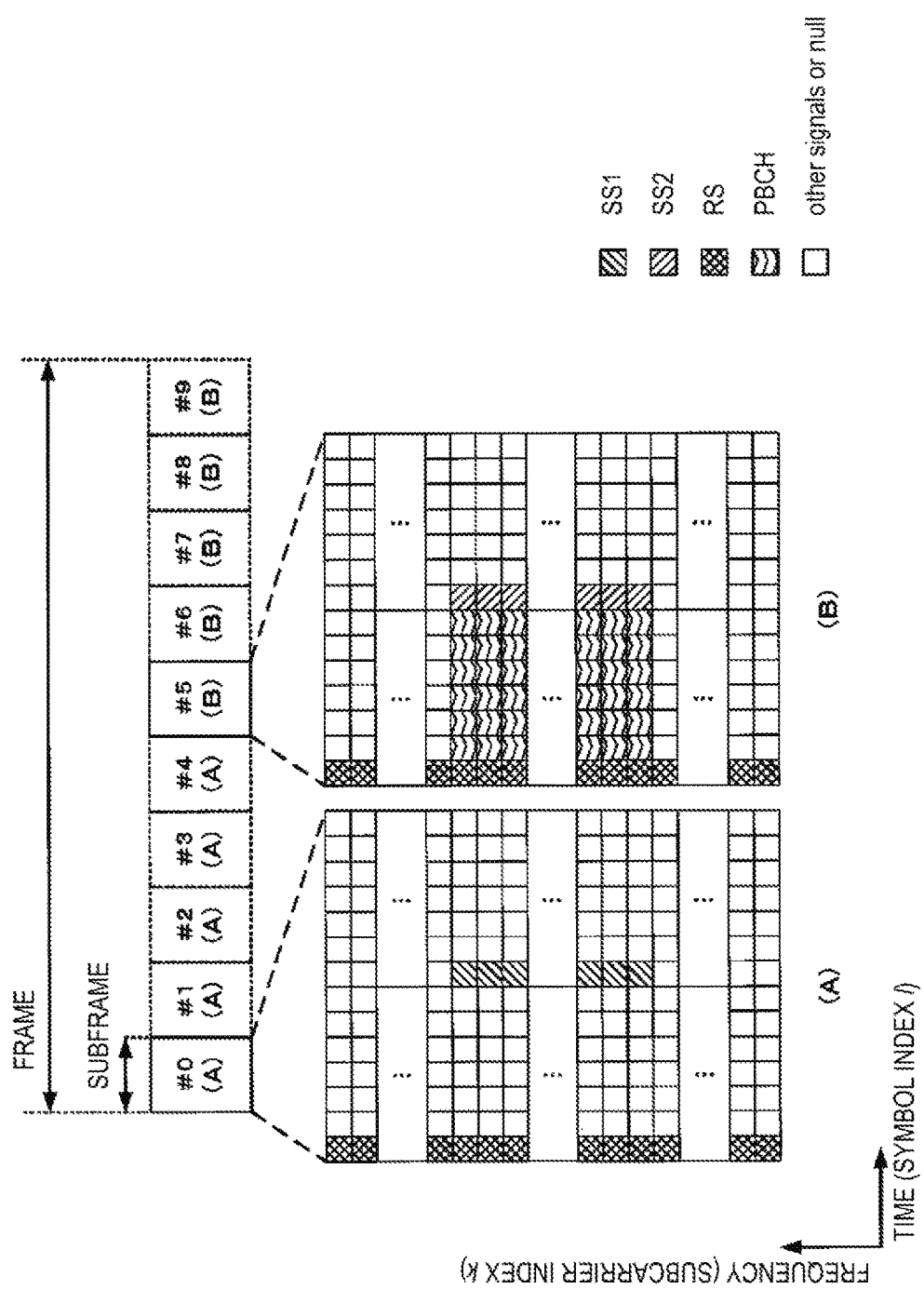
FIG. 8 is a diagram illustrating an example of a signal mapping of the radio frame according to the embodiment of the present invention.
Figure 9:
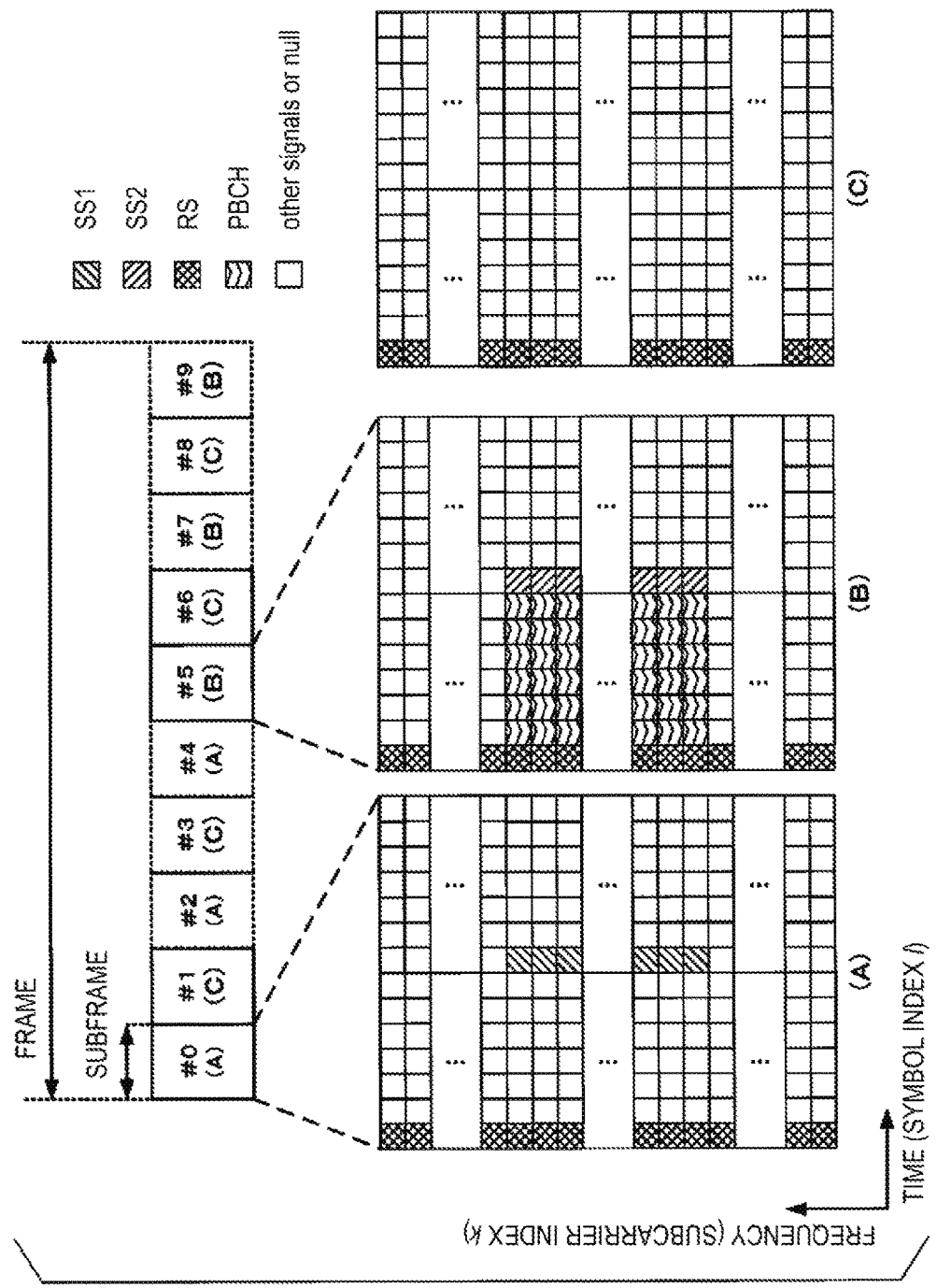
FIG. 9 is a diagram illustrating another example of the signal mapping of the radio frame according to the embodiment of the present invention.

Next, an example of a frame structure in the present embodiment will be illustrated in FIG. 8 and FIG. 9.

FIG. 8 is a diagram illustrating an example of the frame structure in a case that there are five beamed areas. In FIG. 8, a reference signal, a synchronization signal, and PBCH are mapped in subframe #0 and subframe #5 (Sets of signals (A) and (B) of FIG. 8 are mapped in subframe #0 and subframe #5, respectively). For example, the reference signal, the synchronization signal, and the PBCH to be transmitted in subframe #0 and subframe #5 are transmitted to a certain beamed area. Here, as illustrated in the figure, the reference signal and the synchronization signal may be transmitted at a timing of the same transmission time. Further, the reference signal and the PBCH may be transmitted at a timing of the same transmission time. Moreover, the synchronization signal and the PBCH may be transmitted at a timing of the same transmission time. That is, the reference signal, the synchronization signal, and/or the PBCH may be transmitted all together. For example, in a case that the antenna port numbers are the same in subframe #0 and subframe #5, the reference signal may be used to demodulate the PBCH. Here, subframe set #0 includes subframe #0 and subframe #5. Similarly, a reference signal, a synchronization signal, and PBCH are mapped in subframe #1 and subframe #6. For example, the reference signal, the synchronization signal, and the PBCH to be transmitted in subframe #1 and subframe #6 are transmitted to another beamed area. In this case, subframe set #1 includes subframe #1 and subframe #6. The remaining subframe sets #3, #4, and #5 are similarly configured.

Note that the synchronization signal and the PBCH may be transmitted at the same subcarrier spacing. Further, the reference signal for demodulating the PBCH may be transmitted in the same subcarrier as the synchronization signal.

Similarly, FIG. 9 is a diagram illustrating an example of a frame structure in a case that there are three beamed areas. In FIG. 9, in subframe #0, subframe #1, subframe #5, and subframe #6, a reference signal, a synchronization signal, and PBCH are mapped (Sets of signals (A) and (B) of FIG. 9 are mapped in subframes #0 and #5 respectively, and a set of signals (C) is mapped in subframe #1 and subframe #6). For example, the reference signal, the synchronization signal, and the PBCH to be transmitted in subframe #0, subframe #1, subframe #5, and subframe #6 are transmitted to a certain beamed area. Here, subframe set #0 includes subframe #0, subframe #1, subframe #5, and subframe #6. Likewise, as subframe set #1, sets of signals (A) and (B) of FIG. 9 are mapped in subframe #2 and #7 respectively, and a set of signals (C) of FIG. 9 is mapped in subframe #3 and subframe #8. With respect to a subframe set #2, a set of signals (C) is not mapped, and sets of signals (A) and (B) are mapped in subframe #4 and subframe #9, respectively.

The base station apparatus 3 transmits signals having various frame structures as illustrated in FIG. 8, FIG. 9 or the like. For example, the base station apparatus 3 may transmit a signal having a frame structure in accordance with the number of beamed areas. At this time, the base station apparatus 3 transmits a signal by using the same antenna port (or the same set of antenna ports) in a certain subframe set. In other words, different subframe sets each may allow the signal to be transmitted through a different antenna port (or a different set of antenna ports). Further, an antenna port (or a set of antenna ports) independent for each subframe set may be used. Here, "transmitting a signal by using the same antenna port" also means, for example, that all the physical signals and physical channels or a part thereof may be transmitted through multiple common antenna ports, and that the physical signal and physical channel may be transmitted through respectively independent antenna ports or a common antenna port, and within the subframe set, these antenna ports may remain unchanged.

Next, an operation of the terminal apparatus 2 configured to receive the signals having the frame structures of FIG. 8 and FIG. 9 will be described.

The terminal apparatus 2 in an RRC_IDLE state in which an RRC connection is not established does not recognize the number of beamed areas in a cell before receiving a synchronization signal. Therefore, the terminal apparatus 2 performs processing up to demodulation of PBCH, based on (predefined) relative position information of a subframe including each of the synchronization signal, a reference signal, and the PBCH transmitted in the same subframe set.

Specifically, the terminal apparatus 2 first detects the synchronization signal which is a signal of a known sequence. That is, the synchronization signal includes one or more sequences known by the terminal apparatus 2.

The terminal apparatus 2 can establish time synchronization (symbol synchronization) with a cell that transmits the synchronization signal, from a timing when the synchronization signal is received. Further, in a case that the synchronization signal includes a sequence generated based on a part or all of the cell identity information, the terminal apparatus 2 identifies the sequence of the received synchronization signal to identify a part or all of the cell identifier information of the cell that transmits the synchronization signal. Further, in the examples illustrated in FIG. 8 and FIG. 9, since the synchronization signals are mapped in the two different subframes, the terminal apparatus 2 may recognize whether the synchronization signal is SS1 or SS2, based on the sequence of the detected synchronization signal, a cyclic shift, a combination of the sequence of the synchronization signal and the cyclic shift, and the like.

The sequence of the synchronization signal to be used may be uniquely associated with a cell identity, and/or subframe set information, and/or the subframe number. That is, based on the cell identity, and/or the subframe set in which the synchronization signal is transmitted, and/or the subframe number of a subframe in which the synchronization signal is transmitted, the sequence of the synchronization signal may be applied. Alternatively, the sequence of the synchronization signal may be applied based on the cell identity and the subframe set.

For example, in a certain subframe set, the terminal apparatus 2 may previously recognize that the synchronization signal SS2 is mapped in the fifth subframe after the subframe in which the synchronization signal SS1 is mapped. That is, the subframe in which the synchronization signal SS1 is mapped and the subframe in which the synchronization signal SS2 is mapped may belong to the same subframe set, which may be applied based on a predefined relation (condition). Further, in a certain subframe set, the terminal apparatus 2 may previously recognize that the PBCH is mapped in the same subframe as the subframe in which the synchronization signal SS2 is mapped. That is, the subframe in which the synchronization signal SS2 is mapped and the subframe in which the reference signal is mapped may belong to the same subframe set, which may be applied based on a predefined relation (condition). Here, the relation (condition) may be predefined by a specification and the like and may be information known between the base station apparatus 3 and the terminal apparatus 2.

For example, the terminal apparatus 2 performs synchronization and demodulation of the PBCH while considering at least that in a certain subframe (a subframe in which the synchronization signal SS1 and the reference signal are mapped) and a corresponding subframe which is the fifth subframe after the certain subframe (a subframe in which the synchronization signal SS2, the reference signal, and the PBCH are mapped), the synchronization signals (SS1 and SS2) are transmitted from the same antenna port (or a set of antenna ports) and the reference signal and the PBCH are transmitted from the same antenna port (or the same set of antenna ports).

Here, the synchronization signals may be mapped in multiple subframes within one subframe set, as in the example described above. Further, in a case that the synchronization signals include multiple signals (for example, two types of signal: PSS and SSS), the synchronization signal may be mapped in multiple subframes within one subframe set, Further, the PBCH may be allocated from an n-th symbol of the subframe in which the synchronization signal is detected. Further, the PBCH may be allocated from an n-th symbol in the m-th subframe from the subframe where the synchronization signal is detected. For example, a relationship between a time position at which the PBCH is allocated and a time position at which the synchronization signal is mapped (detected) may be defined by a specification and the like and may be information known between the base station apparatus 3 and the terminal apparatus 2. For example, in a case that the PBCH is allocated from the n-th symbol in the m-th subframe after the subframe in which the synchronization signal is detected, the terminal apparatus 2 may consider at least that the subframe in which the synchronization signal is detected and the m-th subframe after the subframe in which the synchronization signal is detected are included in the same subframe set.

Alternatively, within the time and/or frequency resources configured at the relative position from the synchronization signal, the terminal apparatus 2 may detect a known signal transmitted through the same antenna port as the PBCH to detect the position of the PBCH. Here, the known signal transmitted through the same antenna port as the PBCH may be the reference signal. Further, the known signal transmitted through the same antenna port as the PBCH may be a signal including a particular sequence for detecting the PBCH.

The reference signal (reference signal transmitted through the same antenna port as the PBCH) that can be used for demodulating the PBCH (for the channel compensation of the PBCH) is configured to be a sequence known by the terminal apparatus 2 and be mapped to a resource element known by the terminal apparatus 2. For example, in the subframe, the reference signal may be mapped in a resource element uniquely associated with the cell identity and/or the subframe set information. That is, based on the cell identity and/or the subframe set in which the reference signal is transmitted, the position of the resource element in which the reference signal is mapped may be applied. Further, for example, the sequence of the reference signal to be used may be uniquely associated with the cell identity, the subframe set information, and/or the subframe number. That is, based on the cell identity, the subframe set in which the reference signal is transmitted, and/or the subframe number of a subframe in which the reference signal is transmitted, the sequence of the reference signal may be applied.

Here, in a case that the reference signal to be transmitted by using the same antenna port as the antenna port used for transmitting the PBCH is mapped, for each subframe (or each slot), in four resource elements each of which has a different position: $(k, l)=(k_1, l_1)$, $(k_2, l_2)$, $(k_3, l_3)$, and $(k_4, l_4)$ for example, the terminal apparatus 2 may consider that only the reference signal mapped in the resource element at the position $(k, l)$ described above within the same subframe set is a reference signal transmitted by using the same antenna port as the PBCH. That is, the terminal apparatus 2 may consider that the reference signal mapped in the resource element at the position $(k, l)$ described above in a subframe not within the same subframe set (a subframe belonging to a different subframe set) is transmitted by using another antenna port.

At this time, in the resource element at the position $(k, l)$ described above, the antenna port number (the number for identifying an antenna port) may be defined (configured) differently (independently) for each subframe set. Further, in a case that the antenna port number common between the subframe sets is defined (configured) in the resource element at the position $(k, l)$ described above, the terminal apparatus 2 may consider that only a signal mapped in the resource element at the position (k, l) within the same subframe set is transmitted by using the same antenna port.

For example, FIG. 9 illustrates an example of the antenna port through which the physical signal and the physical channel are transmitted. In subframe #0, subframe #1, subframe #5, and subframe #6 belonging to the same subframe set, the synchronization signal 1 (SS1) and the synchronization signal 2 (SS2) are transmitted from antenna port #10, and the reference signal (RS) and the PBCH are transmitted from antenna port p=20. Next, in subframe #2, subframe #3, subframe #7, and subframe #8 belonging to the same subframe set, the synchronization signal 1 (SS1) and the synchronization signal 2 (SS2) are transmitted from antenna port p=11, and the reference signal (RS) and the PBCH are transmitted from antenna port p=21. Further, in subframe #4 and subframe #9 belonging to the same subframe set, the synchronization signal 1 (SS1) and the synchronization signal 2 (SS2) are transmitted from antenna port p=12, and the reference signal (RS) and the PBCH are transmitted from antenna port p=22.

That is, different (independent) antenna ports are defined (configured) for each subframe set, and the terminal apparatus 2 may consider that only a signal to be transmitted in the subframe belonging to the same subframe set is transmitted through the same antenna port. In a case that the terminal apparatus 2 has identified the synchronization signal, the terminal apparatus 2 may not recognize the number of antenna port through which the physical signal and the physical channel are transmitted, and may simply consider the synchronization signal as the signal to be transmitted through the same antenna port (or the same set of antenna ports) to demodulate the PBCH. Further, based on information included in the MIB or information included in another broadcast information, the terminal apparatus 2 may acquire information on the antenna port number.

Further, as another example in FIG. 9, in subframe #0, subframe #1, subframe #5, and subframe #6 belonging to the same subframe set, the synchronization signal 1 (SS1) and the synchronization signal 2 (SS2) are transmitted from antenna port p=10, and the reference signal (RS) and the PBCH are transmitted from antenna port p=20. Next, in subframe #2, subframe #3, subframe #7, and subframe #8 belonging to the same subframe set, the synchronization signal 1 (SS1) and the synchronization signal 2 (SS2) are transmitted from antenna port p=10, and the reference signal (RS) and the PBCH are transmitted from antenna port p=20. Further, in subframe #4 and subframe #9 belonging to the same subframe set, the synchronization signal 1 (SS1) and the synchronization signal 2 (SS2) are transmitted from antenna port p=10, and the reference signal (RS) and the PBCH are transmitted from antenna port p=20. However, even a signal considered to be transmitted through the same antenna port may be mapped in the subframe as the signal to Which precoding is applied differently for each subframe set (the signal to which an independent precoding index is applied).

That is, the antenna port common between the subframe sets is defined (configured), and the terminal apparatus 2 may consider that only a signal to be transmitted in the subframe belonging to the same subframe set is transmitted through the same antenna port. In a case that the terminal apparatus 2 has identified the synchronization signal, the terminal apparatus 2 recognizes the number of the antenna port through which the physical signal and the physical channel are transmitted. However, the terminal apparatus 2 may consider that only a signal to be transmitted in the subframe belonging to the same subframe set is transmitted through the same antenna port (or the same set of antenna ports) to demodulate the PBCH.

The terminal apparatus 2 may identify the subframe number of a subframe in which the demodulated PBCH is included and identify the subframe number of a subframe included in the same subframe set, in accordance with important information included in the demodulated PBCH or another system information (broadcast information) demodulated based on the information included in the demodulated PBCH, Note that in a case that the synchronization signal uniquely generated according to the position of the subframe is used, the subframe number may be identified before the PBCH is demodulated.

The terminal apparatus 2 demodulates the PBCH to acquire information from an MIB. For example, the information included in the MIB may include some or all of the pieces of the following information (A) to (D): (A) information on a subframe set, (B) Information on a geographically identical transmission point, (C) Access information, and (D) Super frame number.

Figure 10:
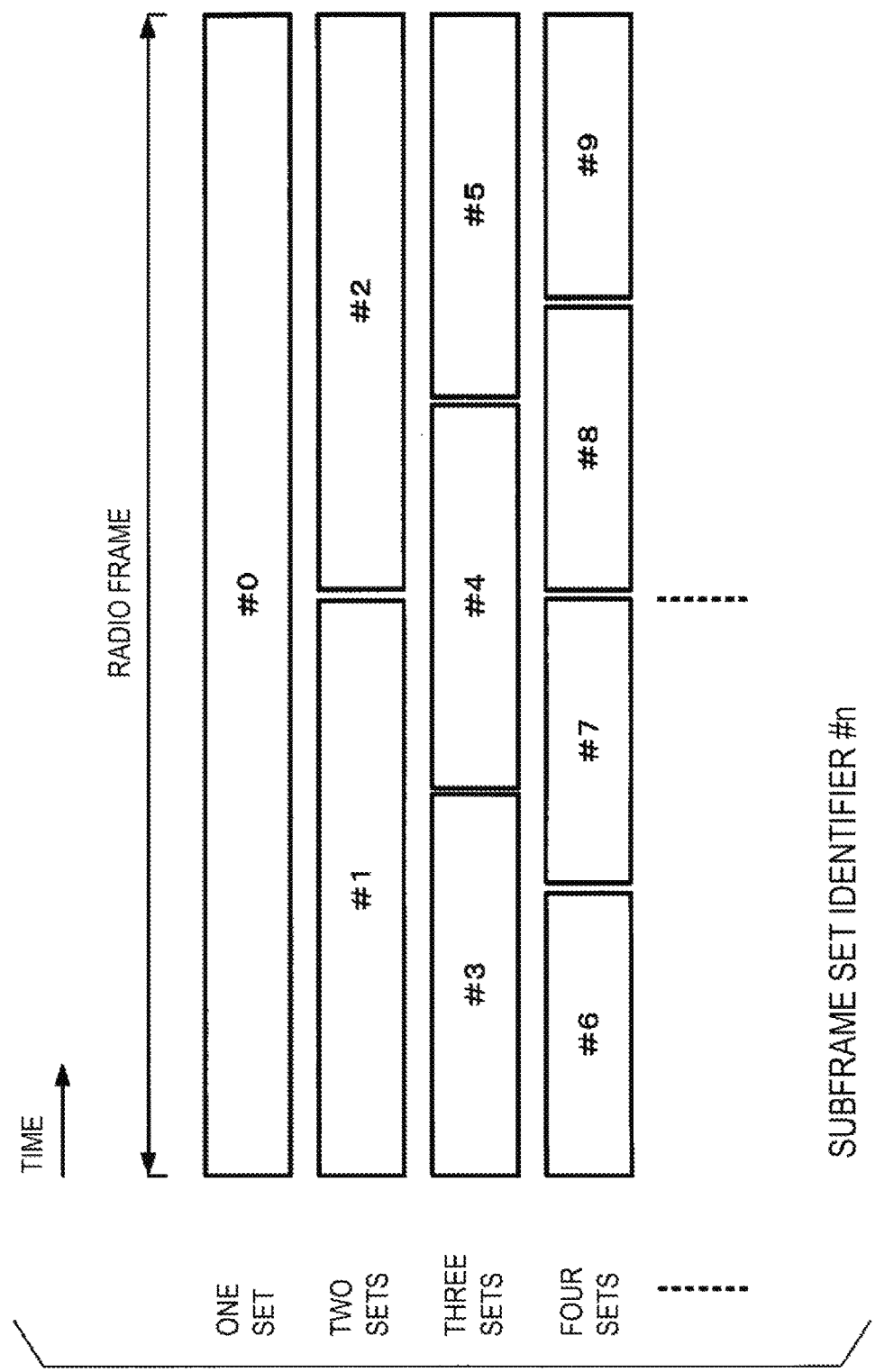
FIG. 10 is a diagram illustrating an example of a subframe set identifier according to the embodiment of the present invention.

Here, the information on a subframe set may include identifier information of the subframe set to which the subframe including the demodulated PBCH belongs. In addition, the information on a subframe set may include the number of subframe sets in the cell. Further, the information on a subframe set may include information on the subframe which may be considered, by the terminal apparatus 2, to belong to the same subframe set. Here, for example, as illustrated in FIG. 10, based on the identifier information of the subframe set, the number of subframe sets and/or the position of the subframe within the frame may be uniquely identified. Thus, even in a case that the information on the subframe set is not included in the synchronization signal, a frame synchronization can be established.

Further, the information on the geographically identical transmission point may include information for indicating whether an antenna port of each subframe set is an geographically identical transmission point (as essential information). For example, in a case that all the subframe sets are transmitted from the same transmission point. True may be set, and in a case that some or all of the subframe sets are transmitted from different transmission points, False may be set. Thus, in a case that all the subframe sets are transmitted from the same transmission point, a time synchronization process using the signals of multiple subframe sets and the like may be performed.

Further, the access information may include permission information that allows the terminal apparatus 2 to identify whether the cell is considered as an appropriate cell. Further, information such as (1) whether the cell is operating multiple numerologies, (2) which numerology is being operated, (3) whether there is an assisting cell, may be included.

The super frame number may include information for indicating the position in a super frame configured of a predetermined number of consecutive frames.

As in the example of the cell search described above, even in a case that multiple synchronization signals are detected and the multiple synchronization signals are generated based on the same cell identity, the terminal apparatus 2 can restrain reception performance degradation caused by using the signals of different subframe sets within a frame, by performing processing with the assumption that the antenna port is configured for each subframe set including each of the multiple synchronization signals.

Note that in the above description, for convenience, the subframe set is defined and described as a set of subframe units, but the present embodiment is not limited thereto, and the set may be defined as a set of subframe units and/or a set of slot units, and/or a set of symbol units, or a combination thereof. For example, the set may be constituted by the symbol or the slot including the synchronization signal, and the subframe including the PBCH.

Beam management and/or beam sweeping according to the embodiment of the present invention will be now described.

Beamforming will be now described. Beamforming on the transmission side is a method of controlling, in an analogue or digital manner, the amplitude/phase of a signal for each of multiple transmit antenna elements to transmit the signal with a high transmit antenna gain in a selected direction, and a field pattern thereof is referred to as transmission beam. Further, a beam on the reception side is a method of controlling, in an analogue or digital manner, the amplitude/phase of a signal for each of multiple receive antenna elements to receive the signal with a high receive antenna gain in a selected direction, and a field pattern thereof is referred to as reception beam.

The beamforming may be referred to as virtualization, precoding, and multiplication with a weight, for example. Further, a beamformed transmit signal may be simply referred to as a transmission beam.

Note that an antenna port may be assigned to each of the precoding processings or each of the transmission beams. For example, a signal to be transmitted by using a different precoding processing or a signal to be transmitted by using a different transmission beam according to the present embodiment may be defined as a signal to be transmitted through a different antenna port or multiple different antenna ports. However, the antenna port is defined as an antenna port that allows a channel on which a certain symbol is transmitted through a certain antenna port to be inferred from a channel on which another symbol is transmitted through the same antenna port. The same antenna port also means that the antenna port number (the number for identifying an antenna port) may be the same. An antenna port set may be constituted by multiple antenna ports. The same antenna port set also means that the antenna port set number (the number for identifying an antenna port set) may be the same. A signal to be transmitted by applying a different terminal transmission beam also means that the signal may be transmitted through a different antenna port or a different antenna port set constituted by multiple antenna ports. A beam index may be an OFDM symbol number, an antenna port number, or an antenna port set number. Note that a beam index may be an antenna port number or an antenna port set number.

In the beamforming of downlink transmission, a beam used by the base station apparatus 3 or the TRP4 is also referred to as base station transmission beam (gNB Tx beam), and in the beamforming of downlink reception, a beam used by the terminal apparatus 2 is also referred to as terminal reception beam (UE Rx beam). Note that the terminal transmission beam and the base station reception beam may be collectively referred to as an uplink beam, and the base station transmission beam and the terminal reception beam may be collectively referred to as a downlink beam. Note that processing performed by the terminal apparatus 2 for the uplink beamforming may be referred to as terminal transmission beam processing or uplink precoding, and processing performed by the base station apparatus 3 may be referred to as base station reception beam processing. Note that processing performed by the terminal apparatus 1 for the downlink beamforming may be referred to as terminal reception beam processing, and processing performed by the base station apparatus 3 may be referred to as base station transmission beam processing or downlink precoding. A complex modulation symbol for one or more layers generated by layer mapping is input into transform precoding. The transform precoding may be processing for dividing a block of complex-valued symbols into sets for each layer corresponding to one SC-FDMA symbol. In a case where the OFDM is used, DFT processing in the transform precoding may not be necessary. In the precoding, the block of vectors obtained from a transform precoder may be input to generate a block of vectors to be mapped to a resource element. In a case of spatial multiplexing, one of precoding matrices may be adapted in generating the block of vectors to be mapped to a resource element. This processing may be referred to as digital beamforming. Further, the precoding may be defined to include analog beamforming and digital beamforming, or may be defined as digital beamforming. The beamforming may be applied to a precoded signal, and the precoding may be applied to a signal to which the beamforming is applied. The beamforming may include digital beamforming and may not include analog beamforming, or may include both digital beamforming and analog beamforming. A beamformed signal, a precoded signal, or a beamformed and precoded signal may be referred to as a beam. An beam index may be a precoding matrix index. The beam index and the precoding matrix index may be defined independently. The precoding matrix indicated by the precoding matrix index may be applied to the beam indicated by the beam index to generate a signal. The beamforming indicated by the beam index may be applied to the signal to which the precoding matrix indicated by the precoding matrix index is applied, to generate a signal. The digital beamforming may include application of a different precoding matrix to a resource in a frequency direction (for example, a set of subcarriers).

Figure 11:
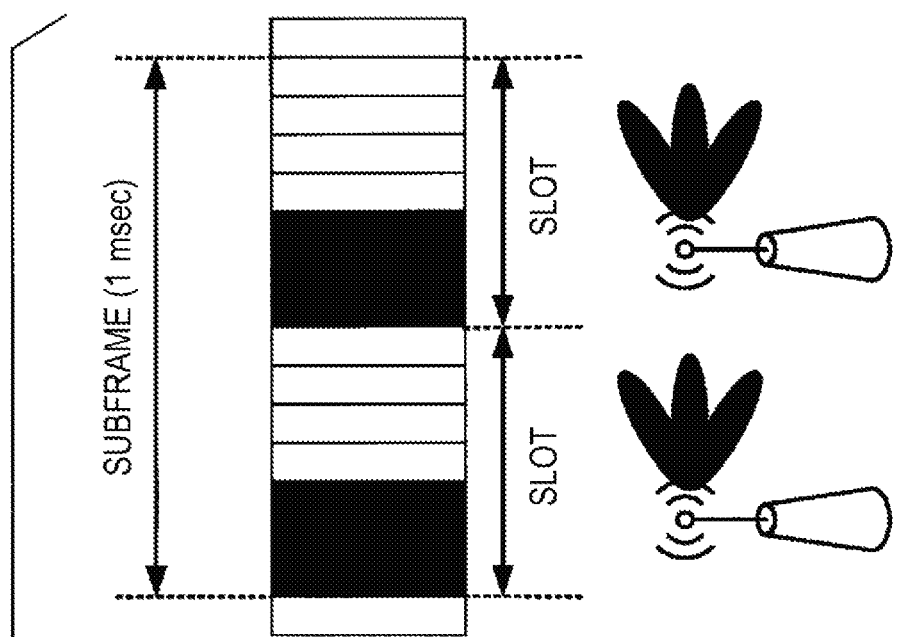
FIG. 11 is a diagram illustrating an example of a relationship between each beam and an OFDM symbol in a case that beam sweeping is applied for each OFDM symbol within a slot according to the embodiment of the present invention.
Figure 11:
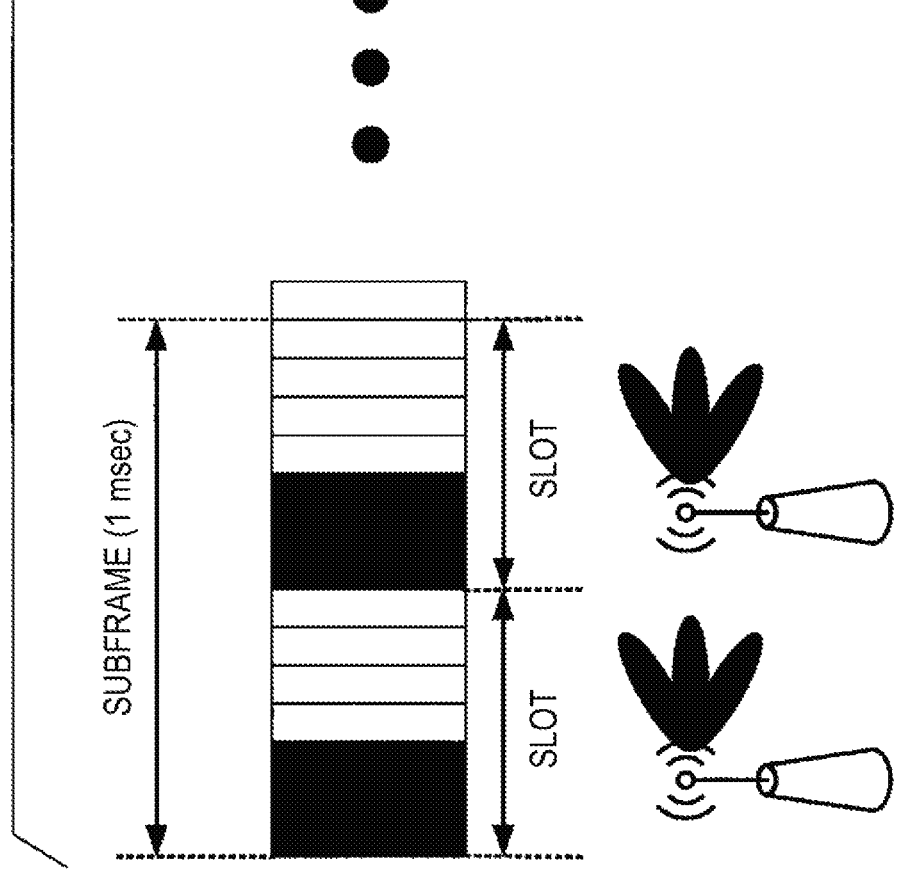

FIG. 11 illustrates an example of beam sweeping in the base station apparatus 3 or the TRP4. In FIG. 11, a different beamforming is performed for each OFDM symbol within a slot, and the terminal apparatus 2 receives a synchronization signal (PSS and/or SSS) in each symbol.

The terminal apparatus 2 receives the synchronization signal in each OFDM symbol in FIG. 11 to identify one synchronization signal. A case will be described below as an example, where the base station apparatus 3 which is a transmission station switches a base station transmission beam for each OFDM symbol. Note that a beam may be switched for each OFDM symbol group including multiple OFDM symbols, or may be switched for each slot or each subframe.

The above embodiment describes the example where the synchronization signal and the reference signal are transmitted from the same antenna port within a subframe set, but in the present embodiment, it may be considered that a transmission beam is switched between OFDM symbols within the subframe set in which the synchronization signal is transmitted.

Multiple base station transmission beams may be transmitted in one OFDM symbol. For example, the antenna element of the base station apparatus 3 may be divided into subarrays to perform beamforming differently for each of the subarrays. Beamforming may be performed differently for each polarization by using a polarization antenna.

Here, in the terminal apparatus 2, the base station transmission beam may be determined based on one or more of the following parameters (a) to (f).

(a) Identity (such as a beam ID, an OFDM symbol ID, and an OFDM symbol group ID)

(b) Reception symbol timing (time resource)
(c) Frequency position (frequency resource)
(d) OFDM symbol number (or index)
(e) OFDM symbol group number (or index)
(f) Antenna port number (or index)

FIG. 11 illustrates an example where the maximum number of OFDM symbols between which the transmission beam is switched is the number of OFDM symbols included within the slot, but may be defined as another unit (such as the number of slots and the number of OFDM symbol groups).

Figure 12:
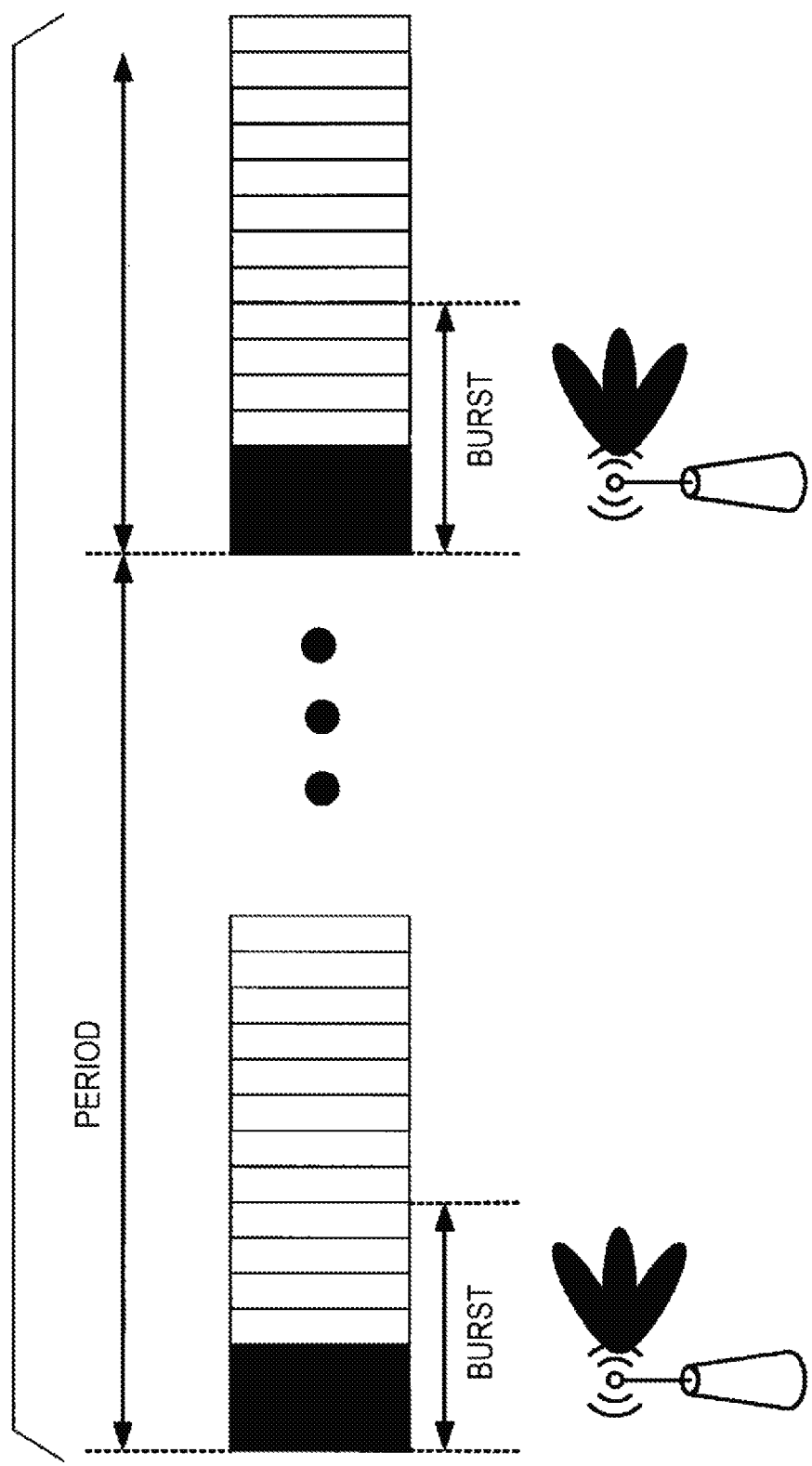
FIG. 12 is a diagram illustrating an example of a relationship between a burst in which beam sweeping is applied for each OFDM symbol within a slot and a period of the burst according to the embodiment of the present invention.

FIG. 12 illustrates an example of a transmission burst for transmitting a synchronization signal and a period for transmitting a synchronization signal. Thus, the transmission period of a synchronization signal and the maximum number of OFDM symbols to which the beam sweeping is applied may be defined as a burst in advance. In FIG. 12, the time resource of the maximum number of OFDM symbols in which a synchronization signal may be transmitted is referred to as a burst, but the number of OFDM symbols, the number of OFDM symbol groups, the number of synchronization symbols and the like may be defined as a burst. Further, a burst may be a subframe unit or a slot unit, or may be constituted by a predefined number of OFDM symbols.

For example, a burst may include both of two types of synchronization signals (PSS and SSS), and some OFDM symbols may not be transmitted within the burst. Further, only either one of PSS and SSS may be included in a burst. A burst may be referred to as a resource set.

Further, the synchronization signal may be transmitted by using one or more base station transmission beams.

Figure 13:
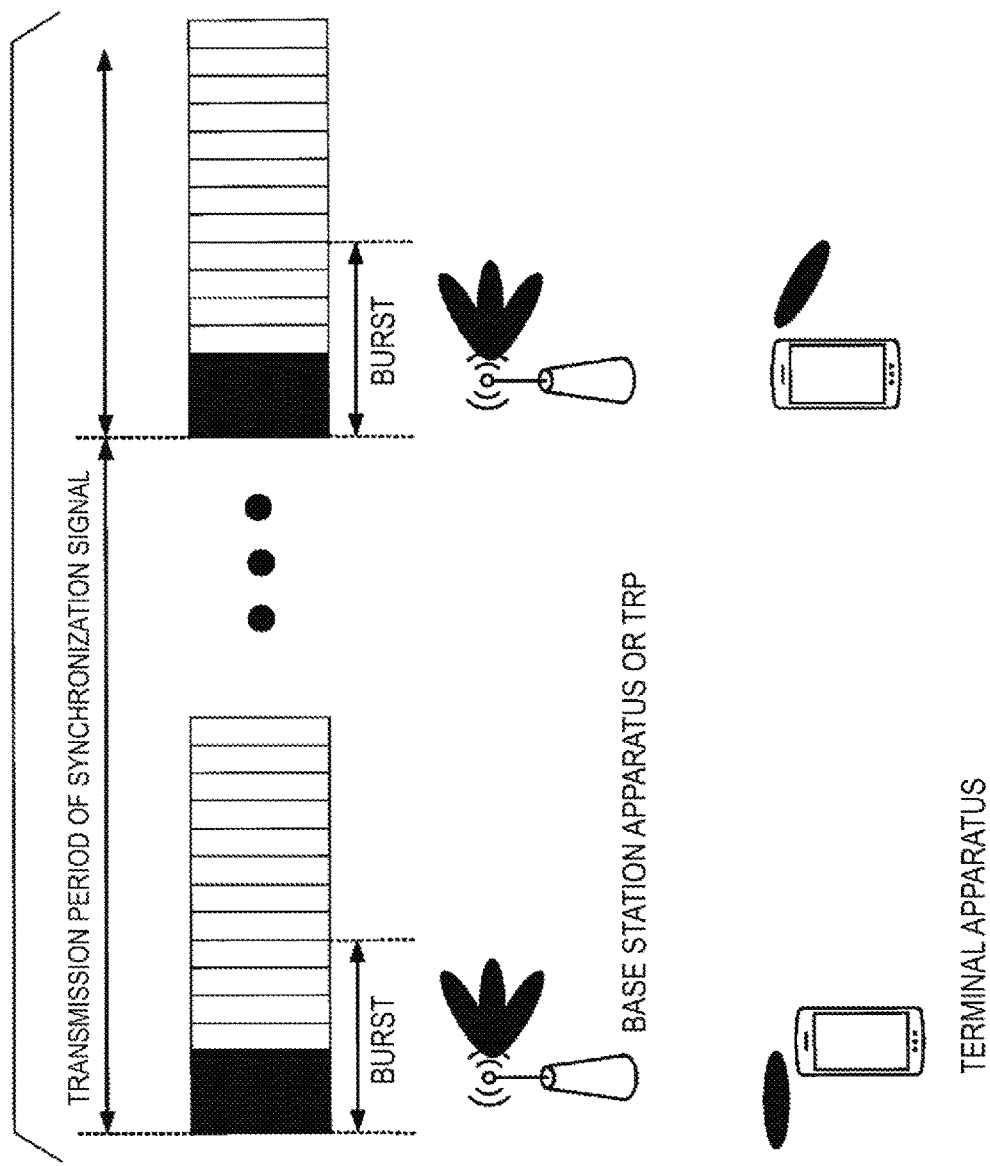
FIG. 13 is a diagram illustrating an example of a relationship between a burst in which beam sweeping is applied for each OFDM symbol within a slot to transmit a synchronization signal and a period of the burst, and an example in a case that beam sweeping for a beam of a reception terminal is applied, according to the embodiment of the present invention.

Next, a case where the terminal apparatus 2 sweeps a reception beam will be described. Here, the terminal apparatus 2 uses one reception beam within a burst to perform reception, and switches the reception beam between bursts. FIG. 13 illustrates an example in a case of switching the reception beam of the terminal apparatus 2. As in FIG. 13, the terminal apparatus 2 receives the synchronization signal beamswept in multiple OFDM symbols or a symbol group within the burst for a selected base station transmission beam to determine the time position.

Thus, in the embodiment of the present invention, the synchronization signal is captured on an OFDM symbol unit basis, the OFDM symbol being included in the burst in which the synchronization signal is transmitted, and in a case of performing the reception beamforming, the reception beam is switched on a burst unit basis.

Note that the above example is provided by using the downlink (communication from the base station apparatus 3 or the TRP4 to the terminal apparatus 2), but the application to the uplink may be possible.

For example, in a case that the terminal apparatus 2 transmits a PRACH preamble, the terminal apparatus switches one or more transmission beams to be applied to the PRACH preamble for each OFDM symbol included in a PRACH resource, and the base station switches the reception beam in the unit of burst of the PRACH resource.

Note that in one aspect of the present invention, multiple base station transmission beams may be assigned to one synchronization signal, and multiple synchronization signals may be mapped to the symbol of each base station transmission beam. Further, the synchronization signal having a single identical transmission waveform (for example, the same identity of the synchronization signal) may be transmitted by applying a different beam for each OFDM symbol. Further, multiple synchronization signals having different transmission waveforms may be mapped for each OFDM symbol. Moreover, multiple synchronization signals having different transmission waveforms and base station transmission beams may be mapped based on a one-to-one relationship. Note that in the example, the synchronization signal for each OFDM symbol is mentioned, but a case is also included in one aspect of the present invention where the transmission waveform before the application of beamforming is the same, and the transmission waveform before the application of beam forming within the burst is applied for each OFDM symbol or each base station transmission beam.

In a case where one synchronization signal applies a different base station transmission beam to each symbol across multiple OFDM symbols, the terminal apparatus 2 may receive a synchronization signal of each OFDM symbol.

Figure 14:
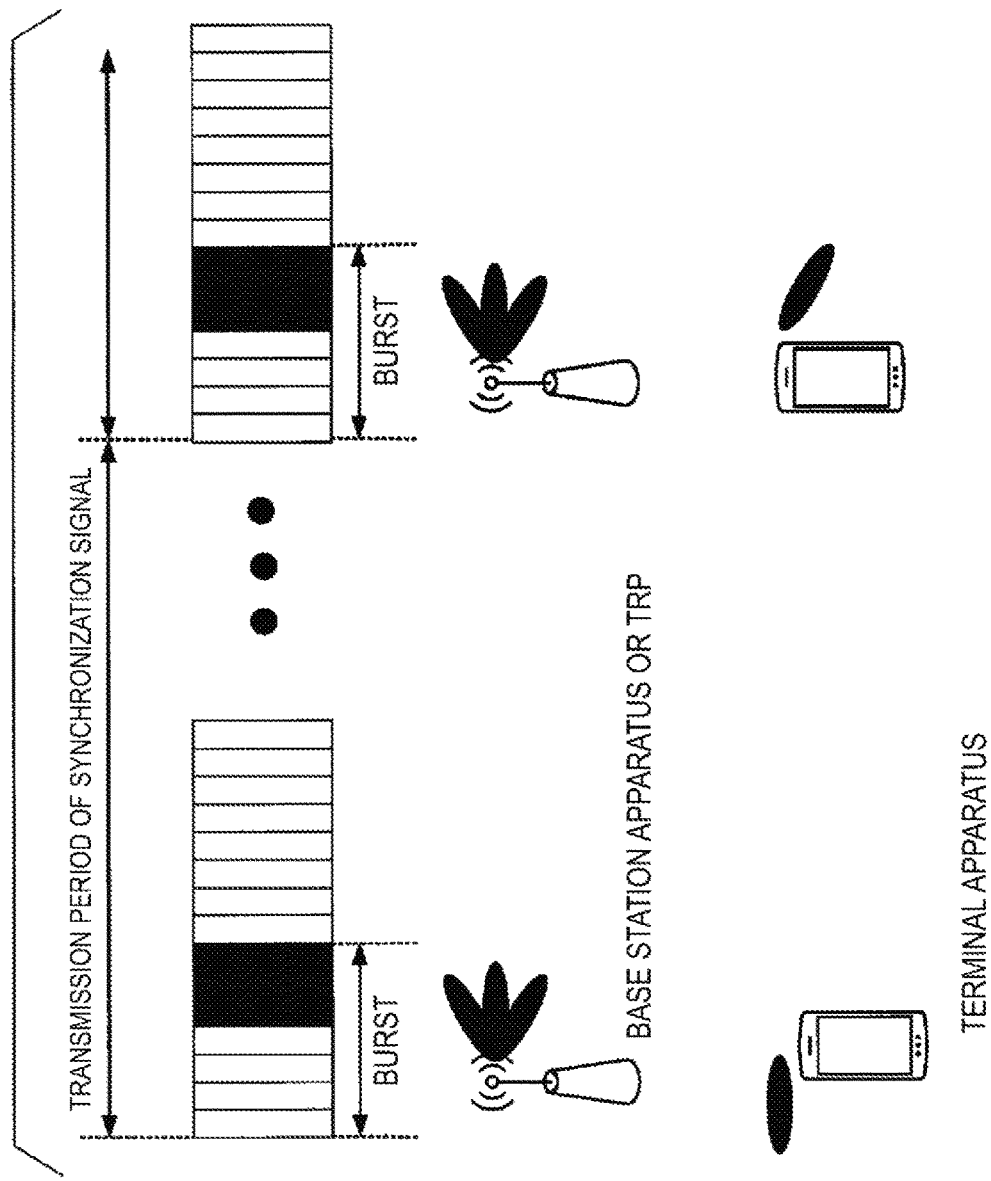
FIG. 14 is a diagram illustrating an example of a relationship between a burst in which beam sweeping is applied for each OFDM symbol within a slot to transmit a synchronization signal and a period of the burst, and an example in a case that beam sweeping is applied from a boundary after a burst, according to the embodiment of the present invention.

In FIG. 14, another example of the mapping of the synchronization signal is illustrated. FIG. 11 to FIG. 13 illustrate the example where the synchronization signal of each transmission beam is mapped from the first OFDM symbol of the slot, and in FIG. 14, the synchronization signal of each beam is mapped from a posterior boundary of the slot.

In FIG. 14, another example of the mapping of the synchronization signal is illustrated. FIG. 11 to FIG. 13 illustrate the example where the synchronization signal of each transmission beam is mapped from the first OFDM symbol of the slot, and in FIG. 14, the synchronization signal of each beam is mapped from a posterior boundary of the slot.

Next, PBCH based on the transmission beam of the synchronized OFDM symbol is detected. At this time, a resource for the PBCH is allocated so as not to be included in a burst of the synchronization signal, the burst allowing the synchronization signal to be transmitted.

Figure 15:
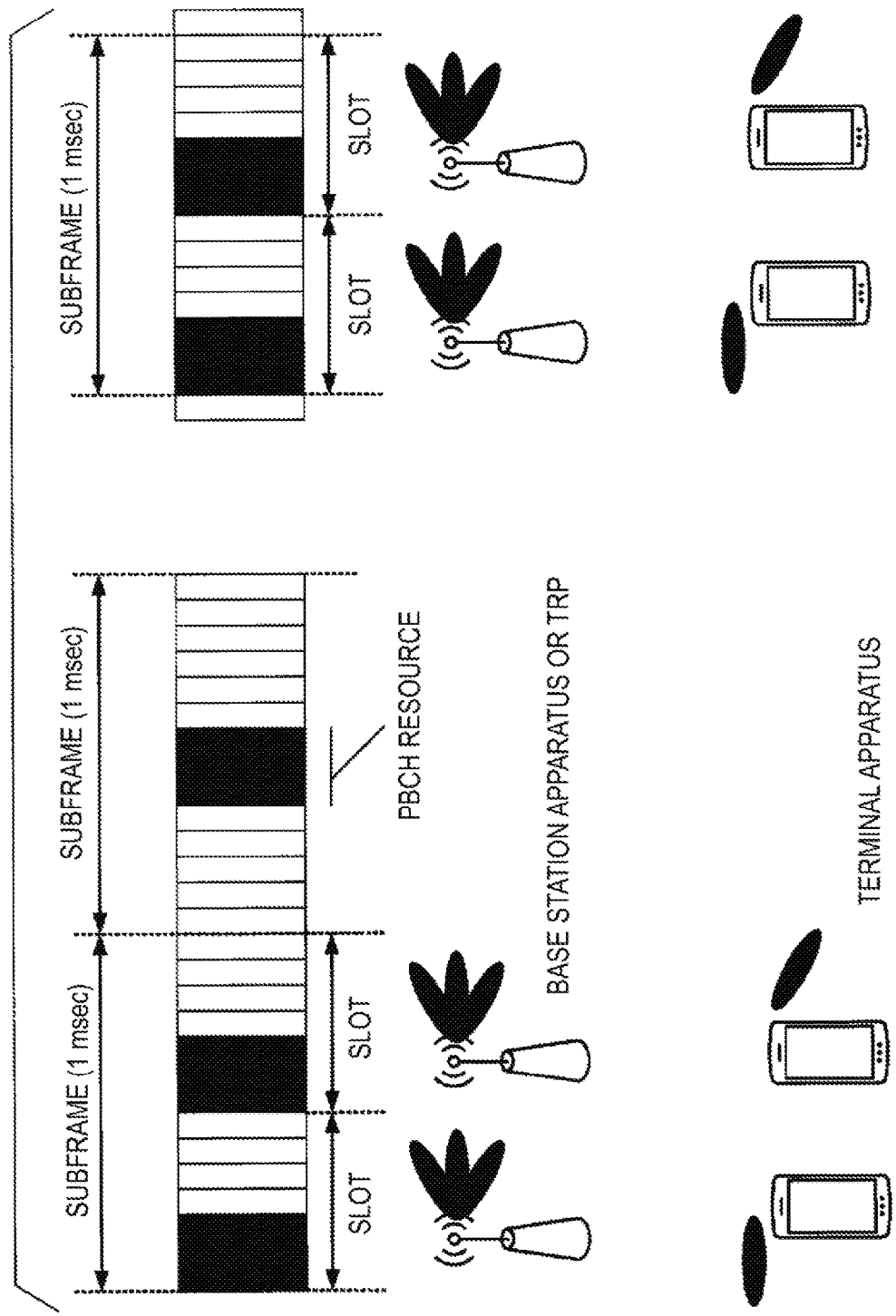
FIG. 15 is a diagram illustrating an example of a relationship between a subframe in which beam sweeping is applied for each OFDM symbol within a slot to transmit a synchronization signal, and a radio resource of a physical broadcast channel, according to the embodiment of the present invention.

FIG. 15 illustrates an example of the allocation of the PBCH. In FIG. 15, a case is illustrated as an example where the switching of a transmission beam is periodically performed in consecutive slots. In FIG. 15, the PBCH is not allocated in the slot in which the synchronization signal is transmitted, regardless of the actual number of beams, and the base station apparatus 3 or the TRP4 does not transmit the synchronization signal in a resource pool in which the synchronization signal may be beamswept and transmitted. Further, in a case that the synchronization signal is transmission beamswept, the terminal apparatus 2 does not assume that the PBCH is allocated in the slot for receiving the synchronization signal, even in a case that the number of transmission beams is fewer than the number of OFDM symbols within the slot.

Note that the synchronization signal, the reference signal, and the PBCH may be transmitted at the reference subcarrier spacing.

In FIG. 15, in a case of detecting the PBCH, based on the OFDM symbol or the synchronization signal of which the time position is determined, the synchronization signal and the PBCH of which the time positions are determined may be considered to be quasi co-located with respect to at least the average delay to be detected.

A configuration of the apparatus in the embodiment of the present invention will be described.

Figure 2:
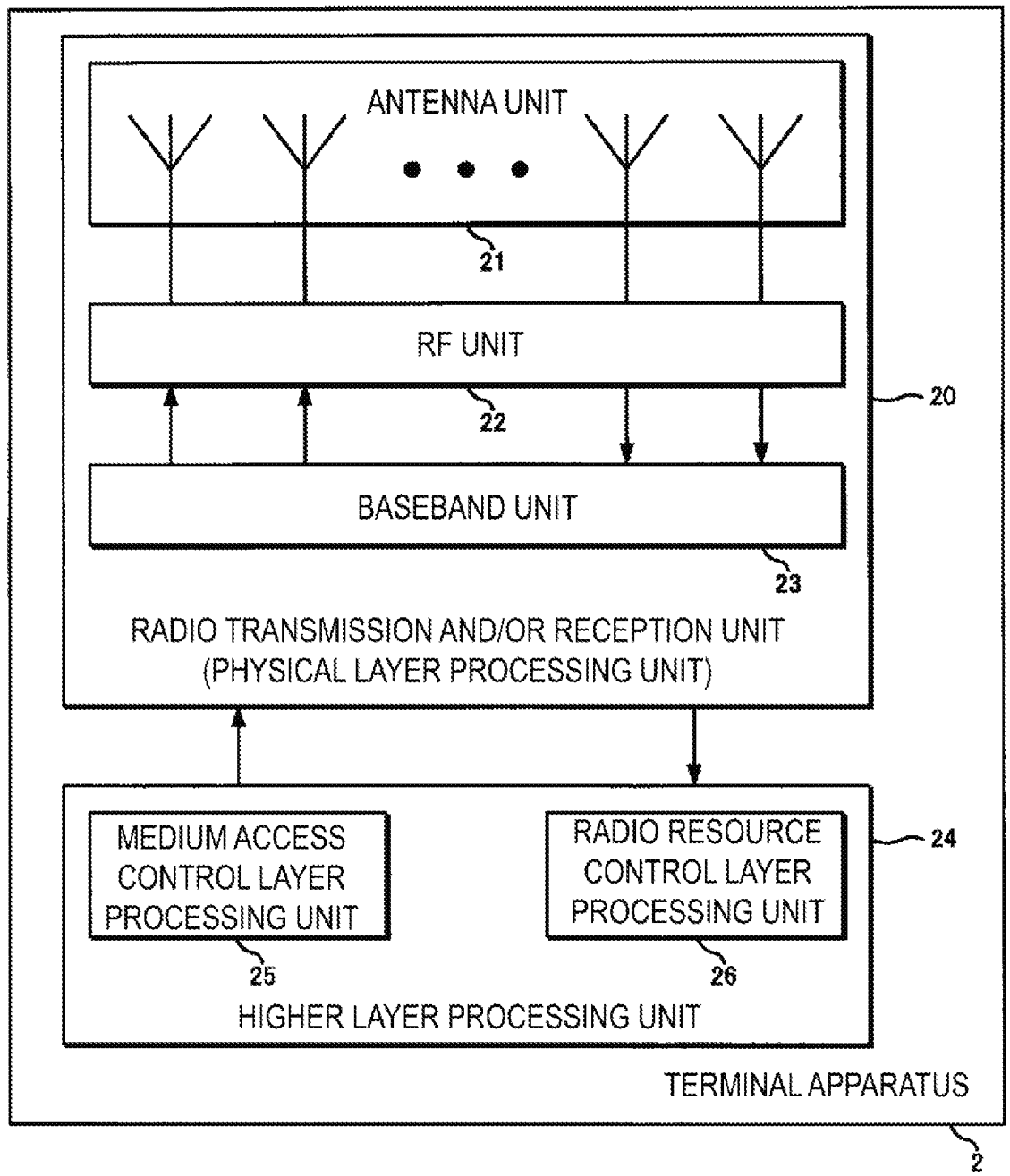
FIG. 2 is a block diagram schematically illustrating an example of a configuration of a terminal apparatus according to an embodiment of the present invention.

FIG. 2 is a schematic block diagram illustrating a configuration of the terminal apparatus 2 according to the present embodiment. As illustrated, the terminal apparatus 2 is configured to include a radio transmission and/or reception unit 20 and a higher layer processing unit 24. The radio transmission and/or reception unit 20 is configured to include an antenna unit 21, a radio frequency (RF) unit 22, and a baseband unit 23. The higher layer processing unit 24 is configured to include a medium access control layer processing unit 25 and a radio resource control layer processing unit 26. The radio transmission and/or reception unit 20 is also referred to as a transmitter, a receiver or a physical layer processing unit.

The higher layer processing unit 24 outputs uplink data (transport block) generated by a user operation or the like, to the radio transmission and/or reception unit 20. The higher layer processing unit 24 performs some or all of the processings of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing of the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing of the Radio Resource Control layer. The radio resource control layer processing unit 26 manages various types of configuration information/parameters of its own apparatus. The radio resource control layer processing unit 26 sets various types of configuration information/parameters based on higher layer signaling received from the base station apparatus 3. Namely, the radio resource control layer processing unit 26 sets the various configuration information/parameters in accordance with the information indicating the various configuration information/parameters received from the base station apparatus 3.

The radio transmission and/or reception unit 20 performs processing of the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data, and performs transmission to the base station apparatus 3.

The RF unit 22 converts (down-coverts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, attaches CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RF unit 22 amplifies power. Furthermore, the RF unit 22 may have a function of controlling transmit power. The RF unit 22 is also referred to as a transmit power controller.

Note that the terminal apparatus 2 may be configured to include a part or all of each unit in multiple, in order to support transmission and reception processing in multiple frequencies (frequency bands, a frequency bandwidths) or the same subframe in the cell.

Figure 3:
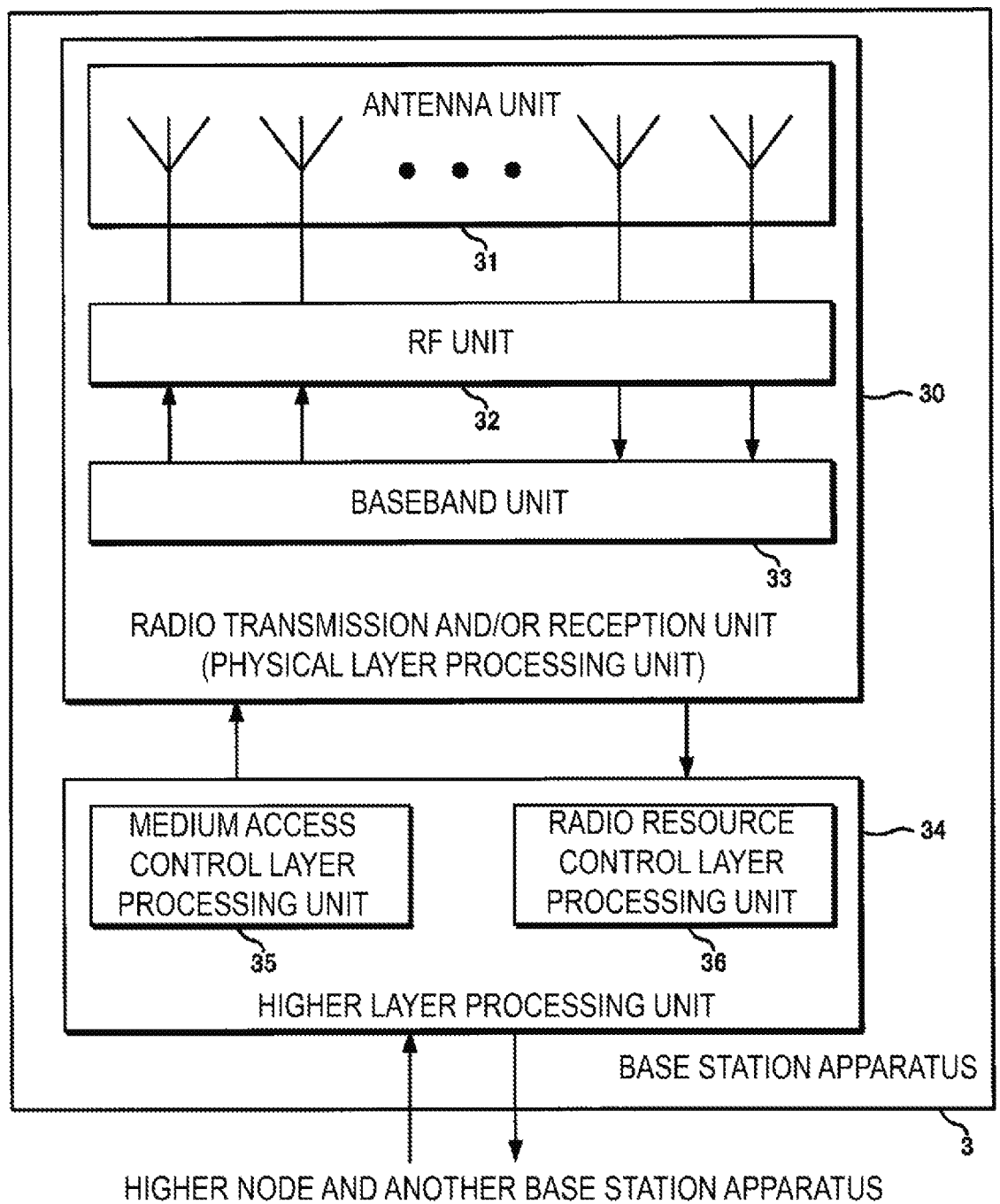
FIG. 3 is a block diagram schematically illustrating an example of a configuration of a base station apparatus according to the embodiment of the present invention.

FIG. 3 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs a part or all of the processings of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 20, and hence description thereof is omitted. Note that in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in NG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit or an application layer processing unit exist in the higher order of the radio resource control layer processing unit 36.

Note that "units" in the drawing refer to constituent elements to realize the functions and the procedures of the terminal apparatus 2 and the base station apparatus 3, which are also represented by the terms such as a section, a circuit, a constituting apparatus, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Various aspects of the terminal apparatus 2 and the base station apparatus 3 according to the embodiment of the present invention will be described.

(1) A first aspect of the present invention is a terminal apparatus including a receiver configured to attempt to receive, in a burst including a plurality of OFDM symbols, a synchronization signal included in each of the plurality of OFDM symbols, a synchronization unit configured to determine a position of a first synchronization signal that is one of the synchronization signals, and a detection unit configured to receive, based on the first synchronization signal, a physical broadcast channel. A radio resource for receiving the physical broadcast channel is not included in the radio resource of the burst.

(2) In the first aspect of the present invention, the burst is defined by the number of the plurality of OFDM symbols included in the burst and a transmission period of the burst, and the receiver is configured to receive the synchronization signal included in each of the plurality of OFDM symbols in the burst, based on a period of the burst.

(3) in the first aspect of the present invention, the plurality of OFDM symbols in the burst and the physical broadcast channel are received at a reference subcarrier spacing.

(4) In the first aspect of the present invention, the detection unit is configured to consider the first synchronization signal and the physical broadcast channel to be quasi co-located with regard to at least an average delay and a delay profile to receive the first synchronization signal and the physical broadcast channel.

(5) A second aspect of the present invention is a base station apparatus including a transmitter configured to transmit, in a burst including a plurality of OFDM symbols, a synchronization signal included in each of the plurality of OFDM symbols, and a broadcast information transmitter configured to transmit a physical broadcast channel corresponding to the synchronization signal included in each of the plurality of OFDM symbols. A radio resource for receiving the physical broadcast channel is not included in the radio resource of the burst.

(6) In the second aspect of the present invention, the burst is defined by the number of the plurality of OFDM symbols included in the burst and a transmission period of the burst, and the transmitter is configured to transmit the synchronization signal included in each of the plurality of OFDM symbols in the burst, based on a period of the burst.

(7) In the second aspect of the present invention, the plurality of OFDM symbols in the burst and the physical broadcast channel are transmitted at a reference subcarrier spacing.

(8) A third aspect of the present invention is a communication method of a terminal apparatus, including the steps of: receiving, in a burst including a plurality of OFDM symbols, a synchronization signal included in each of the plurality of OFDM symbols, determining a position of a first synchronization signal that is one of the synchronization signals, and receiving, based on the first synchronization signal, a physical broadcast channel. A radio resource for receiving the physical broadcast channel is not included in the radio resource of the burst.

(9) A fourth aspect of the present invention is a communication method of a base station apparatus, including the steps of: transmitting, in a burst including a plurality of OFDM symbols, a synchronization signal included in each of the plurality of OFDM symbols, and transmitting a physical broadcast channel corresponding to the synchronization signal included in each of the plurality of OFDM symbols. A radio resource for receiving the physical broadcast channel is not included in the radio resource of the burst.

(10) A fifth aspect of the present invention is an integrated circuit mounted on a terminal apparatus, including: a receiver configured to receive, in a burst including a plurality of OFDM symbols, a synchronization signal included in each of the plurality of OFDM symbols, a synchronizer configured to determine a position of a first synchronization signal that is one of the synchronization signals, and a detector configured to receive, based on the first synchronization signal, a physical broadcast channel. A radio resource for receiving the physical broadcast channel is not included in the radio resource of the burst.

(11) A sixth aspect of the present invention is an integrated circuit mounted on a base station apparatus, including: a transmitter configured to transmit, in a burst including a plurality of OFDM symbols, a synchronization signal included in each of the plurality of OFDM symbols, and a broadcast information transmitter configured to transmit a physical broadcast channel corresponding to the synchronization signal included in each of the plurality of OFDM symbols. A radio resource for receiving the physical broadcast channel is not included in the radio resource of the burst.

(A1) A first aspect of the present invention is a terminal apparatus including: a receiver configured to receive, in a time resource including a plurality of OFDM symbol groups, a synchronization signal included in each of the plurality of OFDM symbol groups, a synchronization unit configured to determine a position of a first synchronization signal that is one of the synchronization signals, and a detection unit configured to receive, based on the first synchronization signal, a physical broadcast channel. The time resource is periodically allocated, and a maximum number of the plurality of OFDM symbol groups in which the synchronization signal included in the time resource is possibly transmitted is predefined.

(A2) In the first aspect of the present invention, the synchronization signal is mapped in some of the plurality of OFDM symbol groups.

(A3) In the first aspect of the present invention, an OFDM symbol in the time resource and the physical broadcast channel are received at a reference subcarrier spacing.

(A4) A second aspect of the present invention is a base station apparatus including: a transmitter configured to transmit, in a time resource including a plurality of OFDM symbol groups, a synchronization signal included in each of the plurality of OFDM symbol groups, and a broadcast information transmitter configured to transmit a physical broadcast channel corresponding to the synchronization signal included in each of the plurality of OFDM symbols.

The time resource is periodically allocated, and a maximum number of the plurality of OFDM symbol groups in which the synchronization signal included in the time resource is possibly transmitted is predefined.

(A5) In the second aspect of the present invention, the synchronization signal is mapped in some of the plurality of OFDM symbol groups.

(A6) In the second aspect of the present invention, an OFDM symbol in the time resource and the physical broadcast channel are transmitted at a reference subcarrier spacing.

(A7) A third aspect of the present invention is a communication method of a terminal apparatus, including the steps of: receiving, in a time resource including a plurality of OFDM symbol groups, a synchronization signal included in each of the plurality of OFDM symbol groups, determining a position of a first synchronization signal that is one of the synchronization signals, and receiving, based on the first synchronization signal, a physical broadcast channel. The time resource is periodically allocated, and a maximum number of the plurality of OFDM symbol groups in which the synchronization signal included in the time resource is possibly transmitted is predefined.

(A8) The fourth aspect of the present invention is a communication method of a base station apparatus, including the steps of: transmitting, in a time resource including a plurality of OFDM symbol groups, a synchronization signal included in each of the plurality of OFDM symbol groups, and transmitting a physical broadcast channel corresponding to the synchronization signal included in each of the plurality of OFDM symbols. The time resource is periodically allocated, and a maximum number of the plurality of OFDM symbol groups in which the synchronization signal included in the time resource is possibly transmitted is predefined.

(A9) A fifth aspect of the present invention is an integrated circuit mounted on a terminal apparatus, including: a receiver configured to receive, in a time resource including a plurality of OFDM symbol groups, a synchronization signal included in each of the plurality of OFDM symbol groups, a synchronizer configured to determine a position of a first synchronization signal that is one of the synchronization signals, and a detector configured to receive, based on the first synchronization signal, a physical broadcast channel. The time resource is periodically allocated, and a maximum number of the plurality of OFDM symbol groups in which the synchronization signal included in the time resource is possibly transmitted is predefined.

(A10) A sixth aspect of the present invention is an integrated circuit mounted on a base station apparatus, including: a transmitter configured to transmit, in a time resource including a plurality of OFDM symbol groups, a synchronization signal included in each of the plurality of OFDM symbol groups, and a broadcast information transmitter configured to transmit a physical broadcast channel corresponding to the synchronization signal included in each of the plurality of OFDM symbols. The time resource is periodically allocated, and a maximum number of the plurality of OFDM symbol groups in which the synchronization signal included in the time resource is possibly transmitted is predefined.

As a result, the terminal apparatus 2 can efficiently start communicating with the base station apparatus 3.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even when the actual applied names differ from the names in the embodiments of the present invention, the spirit of the invention claimed in the embodiments of the present invention is not affected in any way.

The term "connection" used in the respective embodiments is not limited to the configuration in which a certain device and another device are directly connected using a physical line, and includes a configuration in which the devices are logically connected, a configuration in which the devices are radio-connected using the radio technology, and the like.

The terminal apparatus 2 is also called a user terminal, a mobile station apparatus, a communication terminal, a mobile apparatus, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a next generation Node B (gNB).

The base station apparatus 3 according to one aspect of the present invention can also be realized as an aggregation (an apparatus group) configured of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a Next Generation Core network (NextGen Core). Furthermore, the base station apparatus 3 according to the above-described embodiment may have some or all portions of the functions of a node higher than an eNodeB.

A program running on an apparatus according to one aspect of the present invention may serve as a program that controls a Central Processing Unit (CPU) and the like to cause a computer to operate in such a manner as to realize the functions of the above-described embodiment according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnet recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be utilized, for example, in a communication system, a communication apparatus (for example, a mobile phone apparatus, a base station apparatus, a wireless LAN apparatus, or a sensor device), an integrated circuit (for example, a communication chip), or a program or the like.

REFERENCE SIGNS LIST

2 Terminal apparatus
3 Base station apparatus
20, 30 Radio transmission and/or reception unit
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission Reception Point

The invention claimed is:

1. A terminal device comprising:
reception circuitry configured to receive a first synchronization signal included in each of a plurality of orthogonal frequency division multiplexing (OFDM) symbol groups within a time resource, each of the plurality of OFDM symbol groups including a plurality of OFDM symbols; and
synchronization circuitry configured to determine a time position of the first synchronization signal in each of the plurality of OFDM symbol groups within the time resource, wherein
the time resource occurs periodically, and
a maximum number of the plurality of OFDM symbol groups is predefined.

2. A base station device comprising:
transmission circuitry configured to transmit a first synchronization signal included in each of a plurality of orthogonal frequency division multiplexing (OFDM) symbol groups within a time resource, each of the plurality of OFDM symbol groups including a plurality of OFDM symbols, wherein
a time position of the first synchronization signal in each of the plurality of OFDM symbol groups within the time resource is determined, wherein
the time resource occurs periodically, and
a maximum number of the plurality of OFDM symbol groups is predefined.

3. A method for a terminal device comprising:
receiving a first synchronization signal included in each of a plurality of orthogonal frequency division multiplexing (OFDM) symbol groups within a time resource, each of the plurality of OFDM symbol groups including a plurality of OFDM symbols; and
determining a time position of the first synchronization signal in each of the plurality of OFDM symbol groups within the time resource, wherein
the time resource occurs periodically, and
a maximum number of the plurality of OFDM symbol groups is predefined.

4. A method for a base station device comprising:
transmitting a first synchronization signal included in each of a plurality of orthogonal frequency division multiplexing (OFDM) symbol groups within a time resource, each of the plurality of OFDM symbol groups including a plurality of OFDM symbols, wherein
a time position of the first synchronization signal in each of the plurality of OFDM symbol groups within the time resource is determined, wherein
the time resource occurs periodically, and
a maximum number of the plurality of OFDM symbol groups is predefined.

* * * * *